(12) United States Patent
Warrick

(10) Patent No.: US 11,683,287 B2
(45) Date of Patent: *Jun. 20, 2023

(54) HELPING MDNS DISCOVERY BETWEEN RESOURCE-SEEKING AND RESOURCE-PROVIDING DEVICES BY MODIFYING MDNS RESPONSE TO LOWER ONE OR MORE TTL VALUES

(71) Applicant: Bullhead Innovations Ltd., Calgary (CA)

(72) Inventor: Peter S. Warrick, Calgary (CA)

(73) Assignee: Bullhead Innovations Ltd., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/491,668

(22) Filed: Oct. 1, 2021

(65) Prior Publication Data

US 2022/0021641 A1 Jan. 20, 2022

Related U.S. Application Data

(63) Continuation of application No. 17/017,673, filed on Sep. 10, 2020, now Pat. No. 11,165,743.

(Continued)

(51) Int. Cl.
*H04L 29/12* (2006.01)
*H04L 12/18* (2006.01)
*H04L 61/4541* (2022.01)
*H04L 61/4511* (2022.01)
*H04L 61/5069* (2022.01)

(52) U.S. Cl.
CPC ...... *H04L 61/4541* (2022.05); *H04L 12/1886* (2013.01); *H04L 61/4511* (2022.05); *H04L 61/5069* (2022.05)

(58) Field of Classification Search
CPC . H04L 65/4084; H04L 65/60; H04L 65/4076; H04L 41/0893; H04L 67/18; H04L 41/0816; H04L 65/105; H04L 65/1073; H04N 21/43615
See application file for complete search history.

(56) References Cited

U.S. PATENT DOCUMENTS 9,137,281 B2 9/2015 Warrick et al.
9,172,733 B2 * 10/2015 Warrick .............. H04L 12/1886
(Continued)

*Primary Examiner* — Abdullahi E Salad
(74) *Attorney, Agent, or Firm* — ATMAC Patent Services Ltd.; Andrew T. MacMillan

(57) ABSTRACT

An apparatus for helping with multicast domain name service (MDNS) discovery includes one or more processors configured to receive a first MDNS query from the resource-seeking device, receive a first MDNS response from the resource-providing device, and generate a second MDNS response according to the first MDNS response. The second MDNS response is generated at least by including a resource record from the first MDNS response and setting a time-to-live (TTL) value of the resource record in the second MDNS response to be lower than an original TTL value as specified for the resource record in the first MDNS response. The second MDNS response is sent to the resource-seeking device in response to the first MDNS query. A hospitality establishment may thereby soft assign a media device to a user device while retaining the ability to change the media device assigned to the user device.

20 Claims, 13 Drawing Sheets

Related U.S. Application Data

(60) Provisional application No. 62/901,319, filed on Sep. 17, 2019.

(56) References Cited

U.S. PATENT DOCUMENTS

| | | | |
|---|---|---|---|
| 9,479,422 B2* | 10/2016 | Sundaresan | H04L 61/4511 |
| 9,781,172 B2 | 10/2017 | Warrick et al. | |
| 10,686,851 B2 | 6/2020 | Warrick et al. | |
| 11,165,743 B2 | 11/2021 | Warrick | |
| 2013/0332559 A1* | 12/2013 | Mas | H04L 67/52 |
| | | | 709/216 |
| 2014/0012967 A1* | 1/2014 | Agarwal | H04L 61/4511 |
| | | | 709/223 |
| 2014/0214958 A1* | 7/2014 | Cheshire | H04L 61/4541 |
| | | | 709/204 |
| 2016/0021214 A1* | 1/2016 | Unnimadhavan | H04L 67/51 |
| | | | 709/217 |
| 2016/0173636 A1* | 6/2016 | Wang | H04L 67/1001 |
| | | | 709/213 |
| 2018/0074864 A1* | 3/2018 | Chen | G06F 9/5016 |
| 2020/0045089 A1 | 2/2020 | Warrick et al. | |
| 2020/0314107 A1* | 10/2020 | Joshi | H04L 63/10 |

* cited by examiner

Back to soft-assignment of media device after streaming stops

Back to soft-assignment of media device after streaming stops

De-assignment of media device after streaming stops

HELPING MDNS DISCOVERY BETWEEN RESOURCE-SEEKING AND RESOURCE-PROVIDING DEVICES BY MODIFYING MDNS RESPONSE TO LOWER ONE OR MORE TTL VALUES

CROSS-REFERENCE TO RELATED APPLICATIONS

This application is a continuation of Ser. No. 17/017,673 filed Sep. 10, 2020, which claims the benefit of priority of U.S. Provisional Application No. 62/901,319 filed Sep. 17, 2019. Both of these applications are incorporated herein by reference.

BACKGROUND OF THE INVENTION

(1) Field of the Invention

The invention pertains generally to media and entertainment systems utilized at hospitality establishments such as hotels and resorts. More specifically, the invention relates to enabling network-based media sharing protocols such as AirPlay® designed for residential applications to work in hospitality environments.

(2) Description of the Related Art

Guests often bring personal electronic devices with them when they stay at hotels, and these devices typically have stored therein pictures, movies, music, and other media content. One problem encountered by guests is how to utilize the capabilities of the hotel's media system to play media content stored on the guest's personal device. For example, a guest may wish to play vacation videos stored on their personal device on the big-screen television (TV) and high-fidelity audio system provided in their hotel room.

Some electronic devices brought to hospitality establishments by guests natively support one or more network-based media sharing protocols such as AirPlay® by Apple® Inc., DLNA® by the Digital Living Network Alliance®, All Share® by Samsung® Inc., etc. It would be beneficial if the guest could stream content initiated from their personal device to in-room media devices of the hotel's media and entertainment system using these protocols similar to how they can stream content to their home TV via a local area network (LAN) installed in their home.

Most hotels do not have separate computer networks installed in each guest room. Instead, most hotels have a single media network to which all TVs and other in-room media devices within the hotel are connected in order to play media content from a central streaming server. Because existing network-based media sharing protocols (e.g., AirPlay®, DLNA®, AllShare®, etc.) are designed for residential applications, if a guest device supporting one of these protocols were allowed to be connected to the hotel's media network, it would automatically discover and be able to share media content and initiate content streaming operations with all compatible media devices available in the hotel. Such behavior is unacceptable in the hospitality industry because this would allow a guest device to stream personal and remote media content to any TV in any room of the hotel.

BRIEF SUMMARY OF THE INVENTION

According to an exemplary embodiment of the invention there is disclosed an apparatus for helping with multicast domain name service (MDNS) discovery. The apparatus includes one or more network interfaces coupled to a resource-seeking device and a resource-providing device, one or more storage devices, and one or more processors coupled to the one or more network interfaces and the one or more storage devices. By executing a plurality of software instructions loaded from the one or more storage devices, the one or more processors are configured to receive a first MDNS query from the resource-seeking device, receive a first MDNS response from the resource-providing device, and generate a second MDNS response according to the first MDNS response. The second MDNS response is generated at least by including a resource record from the first MDNS response and setting a time-to-live (TTL) value of the resource record in the second MDNS response to be lower than an original TTL value as specified for the resource record in the first MDNS response. The processors further send the second MDNS response to the resource-seeking device in response to the first MDNS query.

According to an exemplary embodiment of the invention there is disclosed an apparatus for helping with multicast domain name service (MDNS) discovery between resourcing-seeking and resource-providing devices on different computer networks. The apparatus includes one or more network interfaces connectable to a first network and a second network, one or more storage devices storing a plurality of software instructions, and one or more processors coupled to the one or more network interfaces and the one or more storage devices. By the one or more processors executing the software instructions loaded from the one or more storage devices, the one or more processors are configured to receive an incoming MDNS query from a resource-seeking device via the first network and select an available resource-providing device from a plurality of resource-providing devices on the second network. The one or more processors are further configured to send an outgoing MDNS query to the available resource-providing device via the second network and receive an original MDNS response from the available resource-providing device via the second network. The one or more processors are further configured to modify one or more resource records of the incoming MDNS response to form a modified MDNS response. The modified MDNS response at least includes a resource record from the original MDNS response but having a time-to-live (TTL) value of the resource record in the modified MDNS response modified to be a lower value than an original time-to-live (TTL) value as specified for the resource record in the original MDNS response from the available media device. The one or more processors are further configured to send the modified MDNS response to the resource-seeking device via the first network.

According to an exemplary embodiment of the invention there is disclosed a method of helping with multicast domain name service (MDNS) discovery between resourcing-seeking and resource-providing devices on different computer networks. The method includes receiving an incoming MDNS query from a resource-seeking device via a first network and selecting an available resource-providing device from a plurality of resource-providing devices on a second network. The method further includes sending an outgoing MDNS query to the available resource-providing device via the second network and receiving an original MDNS response from the available resource-providing device via the second network. The method further includes modifying one or more resource records of the incoming MDNS response to form a modified MDNS response. The modified MDNS response at least includes a resource record from the original MDNS response but having a time-to-live (TTL) value of the resource record in the modified MDNS response modified to be a lower value than an original time-to-live (TTL) value as specified for the resource record in the original MDNS response from the available media device. The method further includes sending the modified MDNS response to the resource-seeking device via the first network.

According to an exemplary embodiment of the invention there is disclosed a non-transitory processor-readable medium comprising a plurality of processor-executable instructions that when executed by one or more processors cause the one or more processors to perform steps of receiving an incoming MDNS query from a resource-seeking device via a first network and selecting an available resource-providing device from a plurality of resource-providing devices on a second network. The steps further include sending an outgoing MDNS query to the available resource-providing device via the second network and receiving an original MDNS response from the available resource-providing device via the second network. The steps further include modifying one or more resource records of the incoming MDNS response to form a modified MDNS response. The modified MDNS response at least includes a resource record from the original MDNS response but having a time-to-live (TTL) value of the resource record in the modified MDNS response modified to be a lower value than an original time-to-live (TTL) value as specified for the resource record in the original MDNS response from the available media device. The steps further include sending the modified MDNS response to the resource-seeking device via the first network.

These and other advantages and embodiments of the present invention will no doubt become apparent to those of ordinary skill in the art after reading the following detailed description of preferred embodiments illustrated in the various figures and drawings.

BRIEF DESCRIPTION OF THE DRAWINGS

The invention will be described in greater detail with reference to the accompanying drawings which represent preferred embodiments thereof.

DETAILED DESCRIPTION

Figure 1:
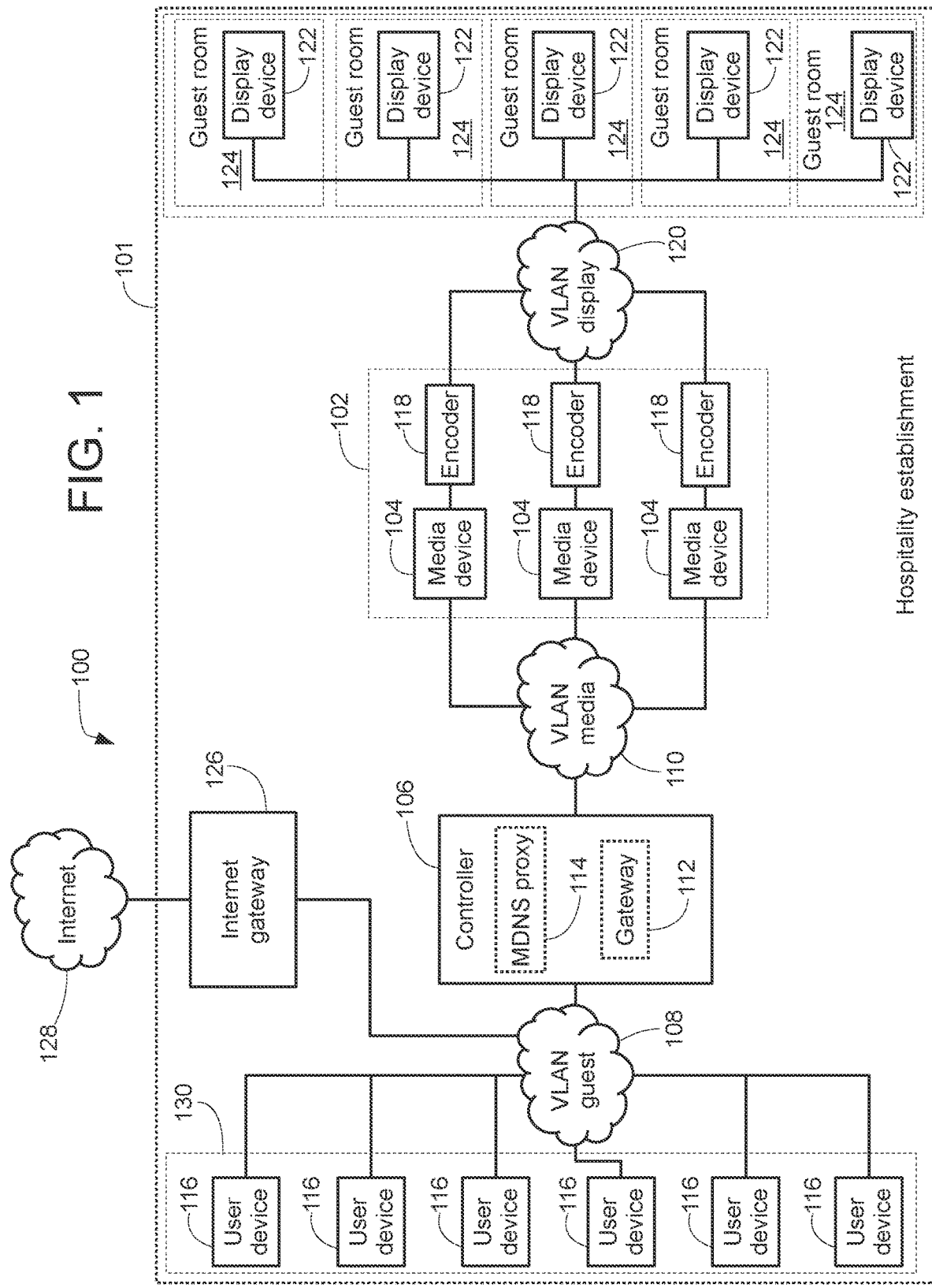
FIG. 1 shows a block diagram of a system for modifying multicast domain name service (MDNS) responses to thereby control assignment of discoverable resource-providing devices available on network according to an exemplary embodiment.

FIG. 1 shows a block diagram of a system 100 for modifying multicast domain name service (MDNS) responses to thereby control assignment of discoverable resource-providing devices 102 available on network according to an exemplary embodiment. In this embodiment, the system 100 is deployed at a hospitality establishment 101 and the resource-providing devices 102 are media devices 104 such AppleTVs® supporting a network-based media streaming protocol such as AirPlay® by Apple Inc.

The system 100 includes a controller 106 coupled to a guest virtual local area network (VLAN-guest) 108 and a media VLAN (VLAN-media) 110. The controller 106 is intermediate these two network segments 108, 110 and includes a gateway module 112 for controlling (i.e., selectively passing and blocking) packets passing between VLAN-guest 108 and VLAN-media 110. The controller 106 further includes an MDNS proxy 114 that, as further explained in the following, generates and proxies various MDNS related messages between the two VLANs 108, 110 in both modified and unmodified forms in order to control which of the plurality of media devices 104 are discoverable and usable by which of a plurality of user devices 116. The gateway 112 within the controller 106 controls the ability of unicast network traffic to be passed between selected user devices 116 and associated media devices 104 depending on assignments dynamically configured by the controller 106. The user devices 116 are coupled to VLAN-guest 108 and include guest devices brought to the hospitality establishment or otherwise utilized by guests of the hospitality establishment. Examples of the guest devices include iOS® devices supporting AirPlay® such as iPhones® and iPads®.

In this embodiment, a set of N media devices 104 are located centrally such as in a server room of the hospitality establishment and each media device 104 has an associated encoder 118 coupled thereto. The output of the encoders 118 is coupled to another VLAN referred to herein as VLAN-display 120, to which each of a plurality of in-room display devices 122 such TVs are coupled. The display devices 122 are located in a plurality of guest rooms 124 and in this embodiment are not required to support the network-based media streaming protocol (e.g., Airplay®). The centralized deployment of media devices 104 in the system of FIG. 1 can be utilized to reduce costs at the hotel 101 because there is no need for the hotel 101 to install a separate media device 104 (e.g., AppleTV®) within each guest room 124.

The system 100 further includes an Internet gateway 126 for controlling the ability of the user devices 116 and media devices 104 to access the Internet 128. For instance, both the user devices 116 and media devices 104 may be caused to stream media content from one or more external content providers available on the Internet 128. Examples of content providers include popular media streaming services such as YouTube®, Netflix®, Hulu®, etc.

The layout of the system 100 and many aspects of its operation and benefits are similar to as disclosed in U.S. Pat. No. 9,172,733 issued on Oct. 27, 2015 and entitled, "DYNAMIC ASSIGNMENT OF CENTRAL MEDIA DEVICE SUPPORTING NETWORK-BASED MEDIA SHARING PROTOCOL TO GUEST DEVICE OF HOSPITALITY ESTABLISHMENT FOR MEDIA SHARING PURPOSES" (hereinafter "the '733 patent"), which is incorporated herein by reference. For instance, FIG. 22 of the '733 patent discloses a system having N sets of media device 104 plus encoder 118 pairs and FIG. 23 of the '733 patent discloses interactions between components to assign one of the central media devices 104 to a user device 116 upon a trigger event, reconfigure a gateway 112 to pass unicast traffic between the user device 116 and its assigned media device 104, and pass traffic from the encoder 118 to a display device 122 in a guest room 124 associated with the user device 116. Examples of various event occurrences that can be utilized to trigger and associate user devices 116 with media devices 104 and associated in-room devices 122 are shown in the '733 patent in FIGS. 11 to 19, for example. Repeated descriptions of these and other similar aspects of how user devices 116 are associated with rooms 124 and/or display devices 122 within a hotel 101, how the gateway 112 within the controller 106 is dynamically configured to selectively pass or not pass unicast traffic between associated user devices 116 and media devices 104, and how the network traffic from the encoders 118 is forwarded to those specific associated display devices 122 are omitted herein for brevity. The reader may refer to the '733 patent for further details.

Figure 2:
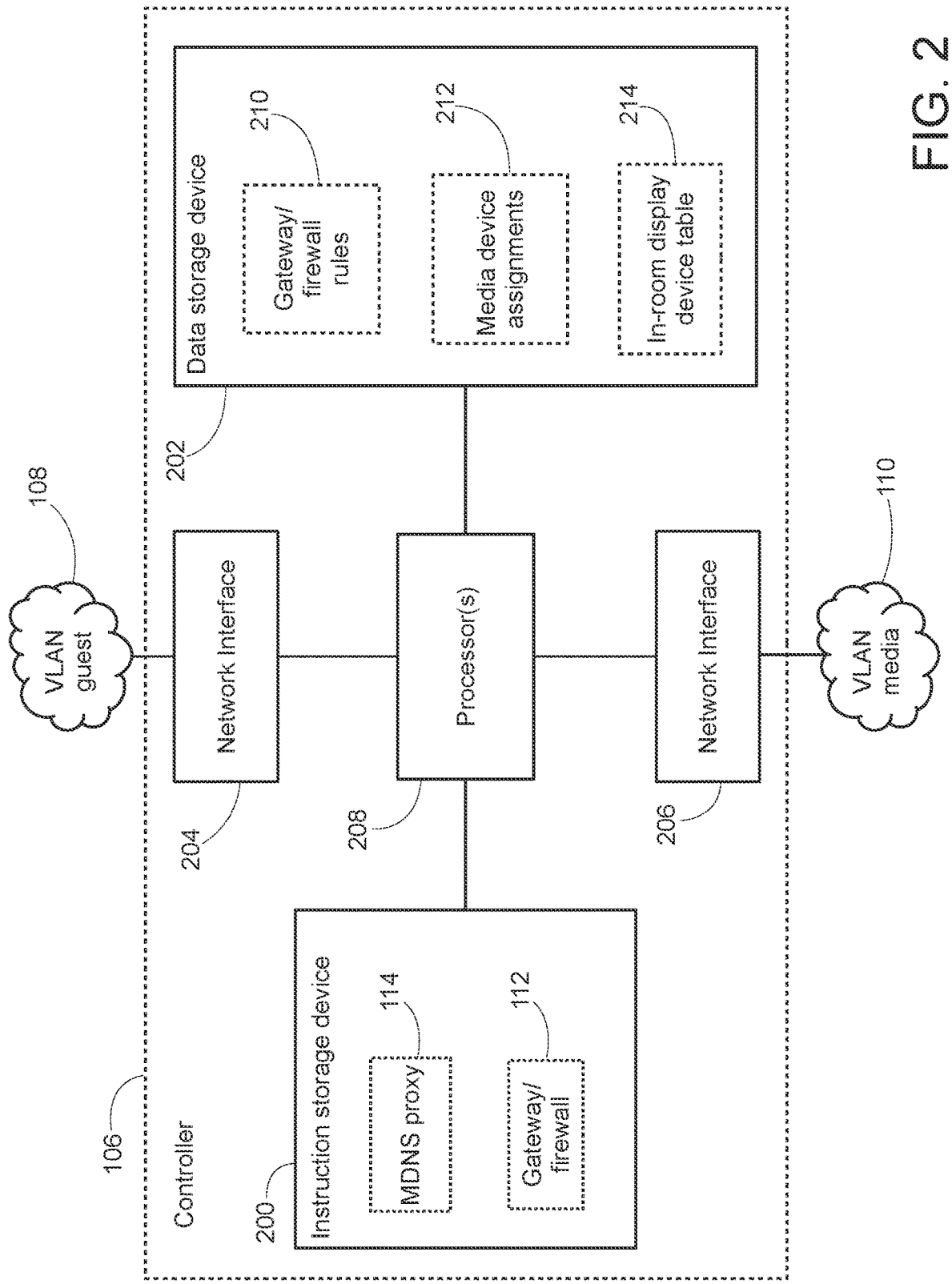
FIG. 2 shows a block diagram of the controller of FIG. 1 according to an exemplary embodiment.

FIG. 2 shows an exemplary block diagram of the controller 106 of FIG. 1. In this embodiment, the controller 106 is a computer server running a number of software modules 112, 114, which are stored in an instruction storage device 200 such as a hard disk or other tangible, non-transitory computer readable medium. A database containing a number of tables 210, 212, 214 of data utilized in conjunction with the software modules 112, 114 is stored in another storage device, referred to herein as the data storage device 202. Of course, in other embodiments, the instructions storage device 200 and data storage device 202 may be one in the same.

The controller 106 includes a first network interface 204 coupled to the VLAN-guest 108, a second network interface 206 coupled to the VLAN-media 110, and one or more processors 208 coupled to the storage devices 200, 202 and network interfaces 204, 206. In the following description, the plural form of the word "processors" will be utilized as it is common for a CPU of a computer server to have multiple processors 208 (sometimes also referred to as cores); however, it is to be understood that a single processor 208 may also be operable to perform the disclosed functionality in other embodiments.

In this embodiment, the modules 112, 114 represent software modules executed by the processors 208 to cause the system controller 106 to perform a variety of functions at the hotel 101. Briefly described, the gateway 112 controls the ability of network traffic to pass between VLAN-guest 108 and VLAN-media 110. In some embodiments, the gateway module 112 as described herein is incorporated with or otherwise implemented by a firewall such as the iptables firewall functionality of a Linux server. The MDNS proxy 114 handles the MDNS service discovery process and dynamic soft and hard assignments between user devices 116 and media devices 104. Other software modules may also be included to give the controller 106 other functionality at the hotel 101 as desired. For example, as described in further details in the '733 patent, other modules may include a reservation manager, a login portal, an expiry manager, a DHCP server, a media device 104 controller, etc. Further details of these modules are omitted herein for brevity; the reader in encouraged to review the '733 patent for more information.

The database tables 210, 212, 214 are utilized by the processors when performing the various functions of modules 112, 114. In this embodiment, the gateway rules 210 contain dynamically updatable network traffic processing rules utilized by the gateway 112. The media device assignments table 212 contains dynamically updatable associations between guest devices 116 and media devices 104 utilized by the MDNS proxy 114. The in-room display device table 214 maps each of the in-room display devices 122 with one or more respective rooms 124, also utilized by the MDNS proxy 114. Although a relational database is utilized in this embodiment, the terms database and table as utilized herein are intended to describe any organization structure of data that allows information to be stored and correlated to other information. The database could just be a flat file or some other form of storing the data. While the program is running this data of device associations is likely stored in memory for quick access and then saved and recalled within a non-volatile memory such as magnetic media should the service be restarted etc.

Figure 3:
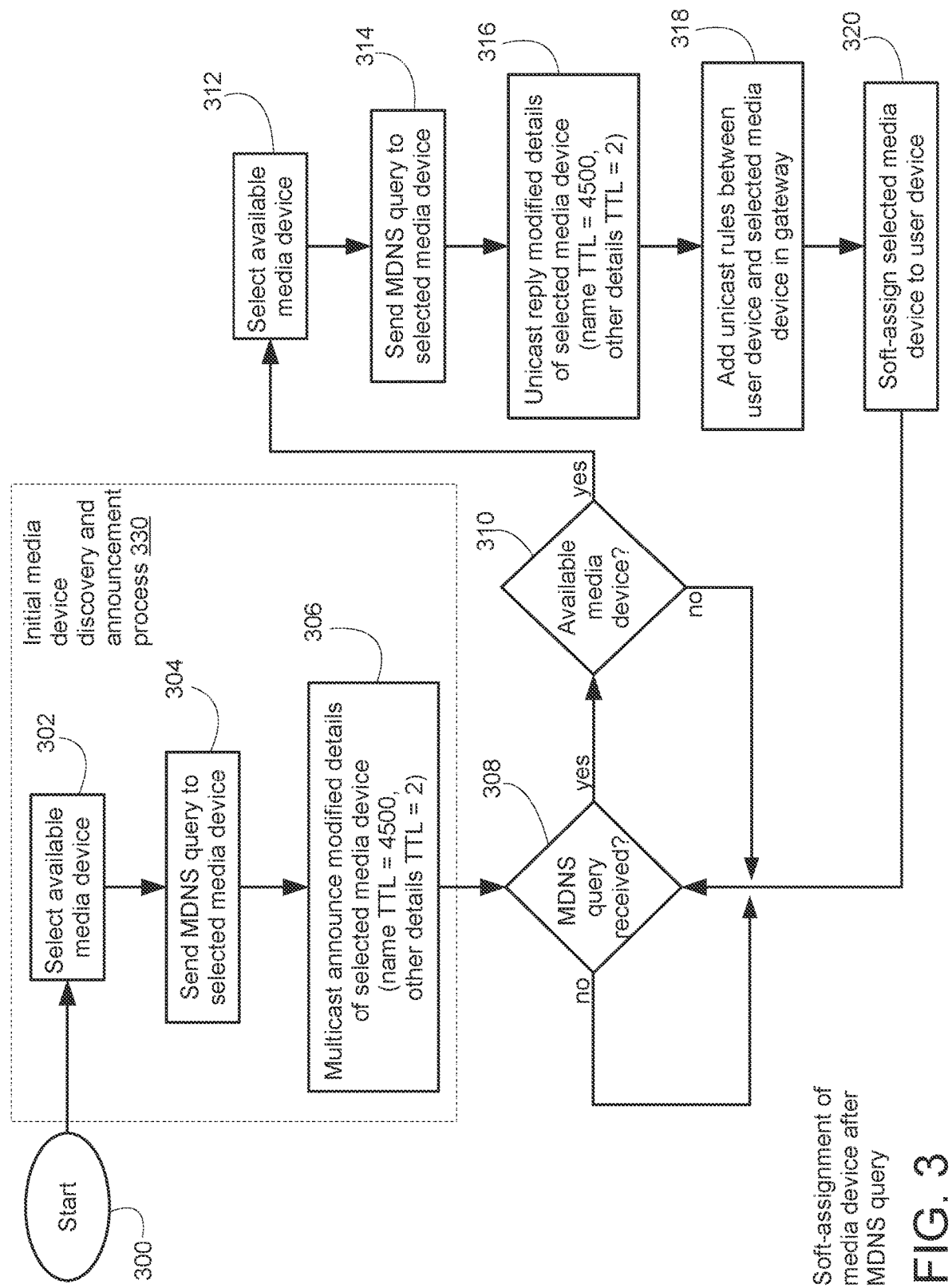
FIG. 3 illustrates a flowchart of operations performed by the controller in order to soft assign a media device after receiving an MDNS query from a user device according to an exemplary embodiment.

FIG. 3 illustrates a flowchart of operations performed by the controller 106 in order to soft assign a media device 104 to a user device 116 after receiving an MDNS query from the user device 116 according to an exemplary embodiment. The steps of FIG. 3 may be performed by processors 208 of the controller 106 executing instructions of the MDNS proxy module 114 and/or gateway module 112. The steps of the flowchart are not restricted to the exact order shown, and, in other configurations, shown steps may be omitted or other intermediate steps added.

The process begins at step 300, which in some embodiments corresponds to power up or start-up of the controller 106 after a reboot.

At step 302, the controller 106 selects an available media device 104. An available media device 104 in this embodiment refers to a media device 104 that is not currently hard-assigned to any user device(s) 116 and is thus available for hard assignment. As described further below, hard assignment occurs when a user device 116 is actually utilizing the media device 104 for streaming or other functions provided by the network-based media streaming protocol. Media devices 104 that are not actually being utilized by a user device 116 are available for soft assignment to user devices 116 in this embodiment. At step 302, the controller 106 queries the media device assignments table 212 in order to determine an available one of the media devices 104 that is not currently being utilized by another user device 116 (i.e., a media device 104 that is not hard-assigned).

Typically when step 302 is reached after power up, all of the plurality of media devices 104 at the hotel 101 will be available and the controller 106 simply selects a first one of the media devices 104 at this step. However, in some embodiments, step 302 may be reached after other start conditions or with other limitations on which of the media devices 104 are actually available. For instance, when a VIP hotel guest is checked into the hotel 101, they may be permanently hard-assigned a central media device 104 until checkout, thereby ensuring that they can begin streaming at any time without worry that there are no available media devices 104 at a future time. Thus, at step 302, the controller 106 will pick an available media device 104 that is not already hard-assigned.

At step 304, the controller 106 sends an MDNS query to the media device 104 as selected at step 302 requesting the resource records for the desired service from the selected media device 104. For instance, assuming the selected media device 104 is an AppleTV® and the desired service is AirPlay®, the controller 106 queries the media device 104 in a manner similar to how an iOS user device such as an iPhone would query for an AppleTV®'s details. In some embodiments, the MDNS query at step 304 is sent out as a unicast query directly to the IP address of the selected media device 104. To reduce network traffic, the controller 106 may make a unicast MDNS query and set the unicast response bit (QU bit) so that the reply is also returned from the media device 104 as a unicast message to the controller 106.

In other embodiments, the MDNS query at step 304 is sent out as a multicast query that is received and replied to by all media devices 104, and the reply from the selected media device 104 is recognized and received by the controller 106. The reply from the media device 104 may be either unicast or multicast. The desired response that is to be utilized by the controller 106 can be selected from the other responses from other media devices 104 by the controller 106 looking for the response that comes from the predetermined IP address of the selected media device 104.

At step 306, the controller 106 multicast announces on VLAN-guest 108 modified details (i.e., sends an unsolicited multicast MDNS response with modified details on VLAN-guest 108) of the selected media device 104 as received from the selected media device 104 in response to the query sent at step 304. In some embodiments, the details as announced by the controller 106 are the same as what was received from the selected media device with certain time-to-live (TTL) values being modified to be much lower than they were in the original response from the selected media device 104. In some embodiments, additional records and information in the records are also modified in addition to reducing TTL values of certain records.

For instance, typically a media device 104 will reply at step 304 with a response on VLAN-media 110 including a plurality of resource records such as the following:

a) _airplay._tcp.local (an00)—PTR—TTL:4500 DATA: CF: true, Domain name: MyMedia._airplay._tcp.local b) _raop._tcp.local (an01)—PTR—TTL:4500 DATA: CF: true, Domain name: 503237AD78D5@MyMedia._raop._tcp.local c) MyMedia._airplay._tcp.local (ad00)—SRV—TTL:120 DATA: CF: true, Priority 0, Weight 0, Port 7000, target MyMedia.local d) MyMedia._airplay._tcp.local (ad01)—TXT—TTL:4500 DATA: CF: true, TXT entries: 15—ATV Version: AppleTV5,3 e) MyMedia._device-info._tcp.local (ad02)—TXT—TTL:4500 DATA: CF: true, TXT entries: 1—ATV Version: J42dAP f) 503237AD78D5@MyMedia._raop._tcp.local (ad03)—SRV—TTL:120 DATA: CF: true, Priority 0, Weight 0, Port 7000, target MyMedia.local g) 503237AD78D5@MyMedia._raop._tcp.local (ad04)—TXT—TTL:4500 DATA: CF: true, TXT entries: 13—ATV Version: AppleTV5,3 h) MyMedia.local (ad05)—AAAA—TTL:120 DATA: CF: true, IPv6: FE80:0000:0000:0000:0CDB:412F:6820:71CB i) MyMedia.local (ad06)—A—TTL:120 DATA: CF: true, IPv4: 10.10.10.100

At step 308, the controller 106 modifies the above response to have a TTL value of two seconds for all resource records except for the resource records that contain the service name in question (i.e., service name of "airplay" in this example). The modified response is then sent out as a multicast announcement on VLAN-guest 108 as follows:

a) _airplay._tcp.local (an00)—PTR—TTL:4500 DATA: CF: true, Domain name: MyMedia._airplay._tcp.local b) _raop._tcp.local (an01)—PTR—TTL:2 DATA: CF: true, Domain name: 503237AD78D5@MyMedia._raop._tcp.local c) MyMedia._airplay._tcp.local (ad00)—SRV—TTL:120 DATA: CF: true, Priority 0, Weight 0, Port 7000, target MyMedia.local d) MyMedia._airplay._tcp.local (ad01)—TXT—TTL:4500 DATA: CF: true, TXT entries: 15—ATV Version: AppleTV5,3 e) MyMedia._device-info._tcp.local (ad02)—TXT—TTL:2 DATA: CF: true, TXT entries: 1—ATV Version: J42dAP f) 503237AD78D5@MyMedia._raop._tcp.local (ad03)—SRV—TTL:2 DATA: CF: true, Priority 0, Weight 0, Port 7000, target MyMedia.local g) 503237AD78D5@MyMedia._raop._tcp.local (ad04)—TXT—TTL:2 DATA: CF: true, TXT entries: 13—ATV Version: AppleTV5,3 h) MyMedia.local (ad05)—AAAA—TTL:2 DATA: CF: true, IPv6: FE80:0000:0000:0000:0CDB:412F:6820:71CB i) MyMedia.local (ad06)—A—TTL:2 DATA: CF: true, IPv4: 10.10.10.100

In this example, the controller 106 modifies the TTL to be two seconds for each of the records except for the records that contain a service name including "airplay". The TTL of these "airplay" named service records remains at the original values of "4500" or "120" seconds as originally sent by the AppleTV®.

A purpose of the controller 106 modifying the MDNS response from the selected media device 104 in this manner is to make the user device 116 aware of the existence of the selected media device 104 providing the desired service (e.g., AirPlay®), while simultaneously preventing the user devices 116 on the network from directly attempting to establish unicast communications with the selected media device 104 in the future. Because the user devices 116 are aware of the selected media device 104 and that the selected media device 104 supports the network-based media sharing protocol (e.g., AirPlay®), the user devices 116 will display an icon representing the media device 104 on the user interface for AirPlay® compatible apps running on the user device 116. A human user can thereby see the icon and know there is a compatible AirPlay device available to which they can attempt to stream or otherwise initiate playback of media content. Upon later user interaction with the icon on the user interface (UI) of their user device 116, for example in a content application such as YouTube® or to initiate screen mirroring, the user device 116 will make a new MDNS query requesting the various resource records that were modified by the controller 106 to have the TTL=2 setting (because they have now expired).

At step 308, the controller 106 checks whether it has received an MDNS query from a user device 116 on VLAN-guest 108. As mentioned above, the query may be received in response to a user interacting with the UI of the user device 116 when attempting to start streaming content to the selected media device 104. Likewise, the query may be received when a user device 116 simply broadcasts a query to check whether there are any AirPlay® compatible devices listening on the network (i.e., the user device 116 may be checking to determine whether to display a media device icon on an AirPlay® compatible app running on the user device). When an MDNS query is received from a user device 116, control proceeds to step 310; otherwise, control stays on step 308 to wait for a query to be received.

At step 310, the controller 106 checks whether there is an available media device 104 in system 100. Similar to step 302, the term "available media device" at this step refers to a media device 104 that is not currently hard-assigned to a user device(s). The controller 106 queries the media device assignments table 212 in order to determine whether there is an available one of the media devices 104 that is not currently being utilized by another user device 116 (i.e., is not hard-assigned). When there is at least one available media device 104, control proceeds to step 312; alternatively, if there are no available media devices 104, the incoming MDNS query received at step 308 is ignored and control returns to step 308 to wait for a subsequent query to be received.

At step 312, the controller 106 queries the media device assignments table 212 in order to select an available one of the media devices 104 that is not currently hard-assigned to any user device 116. In some embodiments, the controller 106 searches the media device assignment table 212 according an identifier of the user device 116 from which the query was received at step 308 in order to select a same media device 104 that is currently soft-assigned to the user device 116 (assuming it is still available, i.e., not hard-assigned to another user device 116). If found, the controller 106 selects the same media device 104. Alternatively, if not found, the controller 106 selects any available media device 104.

At step 314, the controller 106 sends an MDNS query to the media device 104 selected at step 312 requesting the resource records for the desired service from the selected media device 104. For instance, assuming the selected media device 104 is an AppleTV® and the desired service is AirPlay®, the controller 106 queries the media device 104 in a manner similar to how an iOS user device such as an iPhone would query for an AppleTV®'s details. This step is similar to step 302 previously described and in some embodiments is performed in a similar manner.

Since step 302 is performed in response to receiving an actual MDNS query from a user device 116 (at step 308), the controller 106 may model the MDNS query sent at 314 to include similar (or even the same) information as received in the MDNS query received at step 308. In this way, any particular commands or data that is included in the request received by the user device 116 at step 308 will be present in the request sent by the controller 106 at step 314. The controller 106 may also generate the request sent at step 314 to specify its destination as either a multicast address or the IP address of the selected media device 104 according to whether the request received at step 308 was sent as a multicast or unicast query. Likewise, the request sent by the controller 106 at step 314 may also request a unicast or multicast response (i.e., set the QU bit) in the same manner as done in the request received at step 308. If desired, changes may also be made the query. For instance, the controller 106 may change QU bit from multicast to unicast sot that the AppleTV or other service providing will reply with a unicast response.

At step 316, the controller 106 sends an MDNS response (i.e., a solicited response) to the user device 116 on VLAN-guest 108 with modified details of the selected media device 104 as received from the selected media device 104 at step 314. The MDNS response sent at step 316 is responsive to the MDNS query received from the user device 116 at step 308.

In some embodiments, the details as provided by the controller 106 are the same as what was received from the selected media device 104 at step 314 with only certain time-to-live (TTL) values being modified to be lower than they were in the original response from the selected media device 104. For instance, typically the media device 104 will reply at step 314 with a response including a plurality of resource records including a name and other resource records such as address records. Each record has a TTL setting. Similar to as previously described for step 304, the controller 106 keeps the TTL setting for the record(s) having the requested service name (e.g., "airplay") in their name to be their original values such as 4500 seconds and 120 seconds. The controller 106 modifies the TTL settings for the other records such as the IP address records (i.e., "AA" and "AAAA" records) to be a much lower TTL setting such as two seconds (TTL=2). As further described below, other changes to the resource records may also be made by the controller 106 at this step such as changing the name of the resource provide device and/or shutting off "name compression". In other embodiments, the controller 106 re-compresses the names after changing them.

Assuming the MDNS query received at step 308 includes the query unicast (QU) bit set indicating that the user device 116 will accept a unicast reply, the MDNS reply sent at step 316 is sent directly to the user device as a unicast response. The controller 106 in preferred embodiments sends back the response at step 316 within two seconds of receiving the query at step 308. The reason is the MDNS specification has a recommendation for client devices to ignore any unicast responses that are received after a two second duration. In some embodiments, to facilitate a quick unicast response sent within the two second timeline, the controller 106 stores the various service record details of the selected media device 104 in the data storage device 202 in advance of receiving the MDNS query at step 308 so that it is ready to immediately send out the unicast reply with the modified details of the selected media device 104 at step 316.

For protocols and services where the MDNS query at step 308 does not include any special information, steps 312 and 314 may be performed at any prior time such as when the system 100 boots up prior to receiving the request at step 308. For instance, each of the available media devices 104 may be queried at step 304 and each of their responses stored in the data storage device 202 for later usage at step 316. Alternatively, for protocols and services where the MDNS query at step 308 does include specific information that is needed to be included in the query actually received by the selected media device 104, steps 312 and 314 may be performed and the results stored if step 316 is not reached in time (i.e., within the two second or other desired time limit). At step 316, assuming the time limit is not met, control may then return immediately to step 308 to wait for the user device 116 to retry its same MDNS request upon receipt of which the controller 106 immediately replies. In this way, the controller 106 can immediately unicast back modified details of the selected media device 104 at step 316 based on the previously stored records from step 314.

At step 318, the controller 106 adds one or more unicast network rules to the gateway 112 in order to cause the gateway 112 to allow unicast network traffic between the IP address of the selected media device 104 from step 312 and the IP address of the user device 116 from which the MDNS query was received at step 308. For example, in some embodiments this step involves the controller 106 updating the gateway/firewall rules 210 to include a pair of rules allowing traffic in both directions between the IP addresses of the user device 116 and selected media device 104. By default, the gateway/firewall rules 210 block unicast traffic between VLAN-guest 108 and VLAN-media 110 and therefore the rule(s) 210 added at this step 318 enable unicast traffic between these VLANs 108, 110 only between the specific IP addresses specified in the rule. The communication remains possible until the rule(s) are later removed.

In some embodiments, the firewall/router/gateway 112 are on the same computer server as the MDNS proxy 114 and controller 106; however, this is not a requirement. For instance, in some embodiments these modules 112, 114 are separated and the proxy 114 then tells the firewall/router 112 to perform the rules 210 as necessary. For instance, a high speed Internet access control server or other network controller may be instructed to update its firewall/gateway rules by the MDNS proxy 114.

At step 320, the controller 106 updates the media device assignment records 212 to store a soft assignment association between the user device 116 from which the query was received at step 308 and the selected media device 104 selected at step 312. In many cases, the user device 116 will already be soft-assigned to the selected media device 104 and no action will be taken at this step; however, it is also possible that the user device 116 will now be soft-assigned to a new or different media device 104 and the media device assignment records 212 are updated accordingly. Control then proceeds back to step 308 to await a next MDNS query from one of the user devices 116 to be received.

After step 320 is performed in this embodiment, the user device 116 is considered soft-assigned to the selected media device 104 and is cleared for directly unicast communications with that selected media device 104 through the gateway 112. In this way, should a software application on the user device 116 very quickly (i.e., within 2 seconds) attempt to utilize the network-based media streaming protocol (i.e., AirPlay®) in conjunction with the selected media device 104, the IP address record of the selected media device will still be valid (i.e., not expired because still within the two second TTL). The software application on the user device 116 will receive the IP address from the MDNS client running on the user device 116 and will begin sending network traffic to the IP address of the selected media device 104 as specified in the MDNS response sent at step 316. The gateway 112 will pass the traffic from VLAN-guest 108 to VLAN-media 110 as a result of the rule(s) 210 added at step 318, and the selected media device 104 will reply to the IP of the user device 116 and the gateway 112 will pass that traffic too (also due to rule(s) 210 added at step 318). From this point onwards, the user device 116 and the selected media device 104 are in unicast communication via the gateway 112.

Once the user device 116 has started unicast communications with the media device 104, the MDNS address records are no longer needed by the MDNS client of the user device 116 and are not required to be sustained in the MDNS client of the user device 116 for further unicast communications under the network-based media sharing protocol. Beneficially, the expiry of the MDNS records within the MDNS client running on the user device 116 due to the short TTL of 2 seconds has no adverse affect on the ongoing operations of the user device 116 and the selected media device 104 after starting to actually use the network-based media sharing protocol. As long as the user device application has received the required resource records from the MDNS client in order to start using the network-based media sharing protocol prior to expiry of said records, the software application running on the user device 116 can start and maintain communications with the media device 104. In other words, operations of the network-based media streaming protocol (i.e., AirPlay) may be initiated within the two second window and utilized in a continuous basis thereafter even following expiry of the MDNS address records.

Once the user device 116 and media device 104 are communicating in a bidirectional unicast manner, the operations and functionality between them are similar to as in residential applications using AirPlay®, examples include sending content from the user device 116 such as screen mirroring or media content to the media device 104, and also include the user device 116 initiating the media device 104 to stream content from an external provider such as a content provider available on the Internet such as YouTube®, Netflix®, Hulu®, etc.

On the other hand, if the user device 116 does not attempt to start using the network-based media sharing protocol (i.e., AirPlay®) within two seconds of receiving the reply sent by the controller 106 at step 316, the address records and other records of the selected media device with TTL=2 will expire on the user device 116 (e.g., after two seconds). However, because the records with service name "airplay" have a TTL=4500, the AirPlay® icon will still show on the user device 116 for the selected media device 104 and the user is free to attempt to click the icon to initiate streaming at any time. In response to such user action, the user device 116 will send another MDNS query requesting the full details including the address records and any other required records of the media device 104 supporting the "airplay" service name. This subsequent query will be received at step 308 similar to as previously described and the above-described process will repeat to either provide the address and other details of the same soft-assigned media device 104 or perhaps a new address for a different available media device 104 if the prior assigned one is no longer available.

Concerning the MDNS response packets and modifications of the resource records performed by the controller 106 at steps 306 and 316, exemplary packet data is illustrated as follows.

Typically the media device 104 will reply at steps 304, 314 with an original response such as the following:

```
ORIGINAL
--------
00 00 84 00 00 00 00 02 00 00 00 07 08 5F 61 69   - 0000 -
                                          _  a  i
72 70 6C 61 79 04 5F 74 63 70 05 6C 6F 63 61 6C   - 0010 -
 r  p  l  a  y  _  t  c  p     l  o  c  a  l
00 00 0C 00 01 00 00 11 94 00 0A 07 42 65 64 72   - 0020 -
                                     B  e  d  r
6F 6F 6D C0 0C 05 5F 72 61 6F 70 C0 15 00 0C 00   - 0030 -
 o  o  m        _  r  a  o  p
01 00 00 11 94 00 17 14 39 30 44 44 35 44 39 45   - 0040 -
                         9  0  D  D  5  D  9  E
38 44 38 33 40 42 65 64 72 6F 6F 6D C0 35 C0 2B   - 0050 -
 8  D  8  3  @  B  e  d  r  o  o  m     5     +
00 21 80 01 00 00 00 78 00 10 00 00 00 00 1B 58   - 0060 -
 !                    x                         X
07 42 65 64 72 6F 6F 6D C0 1A C0 2B 00 10 80 01   - 0070 -
    B  e  d  r  o  o  m        +
00 00 11 94 01 55 05 61 63 6C 3D 30 1A 64 65 76   - 0080 -
                U     a  c  l  =  0     d  e  v
69 63 65 69 64 3D 39 30 3A 44 44 3A 35 44 3A 39   - 0090 -
 i  c  e  i  d  =  9  0  :  D  D  :  5  D  :  9
45 3A 38 44 3A 38 33 1D 66 65 61 74 75 72 65 73   - 00A0 -
 E  :  8  D  :  8  3     f  e  a  t  u  r  e  s
3D 30 78 34 41 37 46 46 46 46 37 2C 30 78 34 31   - 00B0 -
 =  0  x  4  A  7  F  F  F  F  7  ,  0  x  4  1
35 35 46 44 45 0A 66 6C 61 67 73 3D 30 78 34 63   - 00C0 -
 5  5  F  D  E     f  l  a  g  s  =  0  x  4  c
28 67 69 64 3D 31 46 30 46 33 38 46 45 2D 45 42   - 00D0 -
 (  g  i  d  =  1  F  0  F  3  8  F  E  -  E  B
33 41 2D 34 31 44 33 2D 39 31 32 38 2D 30 46 42   - 00E0 -
 3  A  -  4  1  D  3  -  9  1  2  8  -  0  F  B
45 38 32 39 37 34 31 41 45 05 69 67 6C 3D 31 06   - 00F0 -
 E  8  2  9  7  4  1  A  E     i  g  l  =  1
67 63 67 6C 3D 30 10 6D 6F 64 65 6C 3D 41 70 70   - 0100 -
 g  c  g  l  =  0     m  o  d  e  l  =  A  p  p
6C 65 54 56 36 2C 32 0D 70 72 6F 74 6F 76 65 72   - 0110 -
 l  e  T  V  6  ,  2     p  r  o  t  o  v  e  r
73 3D 31 2E 31 27 70 69 3D 35 31 32 62 30 34 33   - 0120 -
 s  =  1  .  1  '  p  i  =  5  1  2  b  0  4  3
64 2D 36 63 39 34 2D 34 37 38 32 2D 39 34 33 64   - 0130 -
 d  -  6  c  9  4  -  4  7  8  2  -  9  4  3  d
2D 33 66 35 36 66 37 33 64 63 33 36 65 28 70 73   - 0140 -
 -  3  f  5  6  f  7  3  d  c  3  6  e  (  p  s
69 3D 38 32 46 46 31 31 34 46 2D 46 41 34 42 2D   - 0150 -
 i  =  8  2  F  F  1  1  4  F  -  F  A  4  B  -
34 34 43 30 2D 42 46 33 41 2D 32 46 36 39 38 33   - 0160 -
 4  4  C  0  -  B  F  3  A  -  2  F  6  9  8  3
43 42 45 43 39 44 43 70 6B 3D 38 64 61 30 30 62   - 0170 -
 C  B  E  C  9  D  C  p  k  =  8  d  a  0  0  b
39 33 37 34 64 31 38 35 34 35 33 61 38 32 38 39   - 0180 -
 9  3  7  4  d  1  8  5  4  5  3  a  8  2  8  9
62 38 32 66 64 65 35 62 37 35 63 35 61 37 34 63   - 0190 -
 b  8  2  f  d  e  5  b  7  5  c  5  a  7  4  c
62 34 32 66 62 66 31 65 34 33 36 30 36 35 38 35   - 01A0 -
 b  4  2  f  b  f  1  e  4  3  6  0  6  5  8  5
37 37 61 31 32 63 61 39 66 35 0F 73 72 63 76 65   - 01B0 -
 7  7  a  1  2  c  a  9  f  5     s  r  c  v  e
72 73 3D 33 38 33 2E 32 2E 32 0B 6F 73 76 65 72   - 01C0 -
 r  s  =  3  8  3  .  2  .  2     o  s  v  e  r
73 3D 31 32 2E 33 04 76 76 3D 32 07 42 65 64 72   - 01D0 -
 s  =  1  2  .  3     v  v  =  2     B  e  d  r
6F 6F 6D 0C 5F 64 65 76 69 63 65 2D 69 6E 66 6F   - 01E0 -
 o  o  m     _  d  e  v  i  c  e  -  i  n  f  o
C0 15 00 10 00 01 00 00 11 94 00 0E 0D 6D 6F 64   - 01F0 -
                                        m  o  d
65 6C 3D 4A 31 30 35 61 41 50 C0 47 00 21 80 01   - 0200 -
 e  l  =  J  1  0  5  a  A  P     G     !
```

-continued

| | | | | | | | | | | | | | | | | |
|---|---|---|---|---|---|---|---|---|---|---|---|---|---|---|---|---|
| 00 | 00 | 00 | 78 x | 00 | 08 | 00 | 00 | 00 | 1B | 58 X | C0 | 70 p | C0 | 47 G | | - 0210 - |
| 00 | 10 | 80 | 01 | 00 | 00 | 11 | 94 | 00 | BF | 0A | 63 c | 6E n | 3D = | 30 0 | 2C , | - 0220 - |
| 31 1 | 2C , | 32 2 | 2C , | 33 3 | 07 | 64 d | 61 a | 3D = | 74 t | 72 r | 75 u | 65 e | 08 | 65 e | 74 t | - 0230 - |
| 3D = | 30 0 | 2C , | 33 3 | 2C , | 35 5 | 17 | 66 f | 74 t | 3D = | 30 0 | 78 x | 34 4 | 41 A | 37 7 | 46 F | - 0240 - |
| 46 F | 46 F | 46 F | 37 7 | 2C , | 30 0 | 78 x | 34 4 | 31 1 | 35 5 | 35 5 | 46 F | 44 D | 45 E | 07 | 73 s | - 0250 - |
| 66 f | 3D = | 30 0 | 78 x | 34 4 | 63 c | 08 | 6D m | 64 d | 3D = | 30 0 | 2C , | 31 1 | 2C , | 32 2 | 0D | - 0260 - |
| 61 a | 6D m | 3D = | 41 A | 70 p | 70 p | 6C l | 65 e | 54 T | 56 V | 36 6 | 2C , | 32 2 | 43 C | 70 p | 6B k | - 0270 - |
| 3D = | 38 8 | 64 d | 61 a | 30 0 | 30 0 | 62 b | 39 9 | 33 3 | 37 7 | 34 4 | 64 d | 31 1 | 38 8 | 35 5 | 34 4 | - 0280 - |
| 35 5 | 33 3 | 61 a | 38 8 | 32 2 | 38 8 | 39 9 | 62 b | 38 8 | 32 2 | 66 f | 64 d | 65 e | 35 5 | 62 b | 37 7 | - 0290 - |
| 35 5 | 63 c | 35 5 | 61 a | 37 7 | 34 4 | 63 c | 62 b | 34 4 | 32 2 | 66 f | 62 b | 66 f | 31 1 | 65 e | 34 4 | - 02A0 - |
| 33 3 | 36 6 | 30 0 | 36 6 | 35 5 | 38 8 | 35 5 | 37 7 | 37 7 | 61 a | 31 1 | 32 2 | 63 c | 61 a | 39 9 | 66 f | - 02B0 - |
| 35 5 | 06 | 74 t | 70 p | 3D = | 55 U | 44 D | 50 P | 08 | 76 v | 6E n | 3D = | 36 6 | 35 5 | 35 5 | 33 3 | - 02C0 - |
| 37 7 | 0A | 76 v | 73 s | 3D = | 33 3 | 38 8 | 33 3 | 2E . | 32 2 | 2E . | 32 2 | 07 | 6F o | 76 v | 3D = | - 02D0 - |
| 31 1 | 32 2 | 2E . | 33 3 | 04 | 76 v | 76 v | 3D = | 32 2 | C0 p | 70 | 00 | 1C | 80 | 01 | 00 | - 02E0 - |
| 00 | 00 | 78 x | 00 | 10 | FE | 80 | 00 | 00 | 00 | 00 | 00 | 00 | 14 | 1D | C9 | - 02F0 - |
| DD | 09 | 97 | 91 | 4D M | C0 p | 70 | 00 | 01 | 80 | 01 | 00 | 00 | 00 | 78 x | 00 | - 0300 - |
| 04 | 0A | 0A | 0A | 66 f | 04 | 0A | 0A | 0A | 64 d | | | | | | | - 0310 - |

At steps 306, 316, the controller 106 modifies the response packet to be as follows:

ALTERED

| | | | | | | | | | | | | | | | | |
|---|---|---|---|---|---|---|---|---|---|---|---|---|---|---|---|---|
| 00 | 00 | 84 | 00 | 00 | 00 | 02 | 00 | 00 | 00 | 07 | 08 | 5F _ | 61 a | 69 i | | - 0000 - |
| 72 r | 70 p | 6C l | 61 a | 79 y | 04 | 5F _ | 74 t | 63 c | 70 p | 05 | 6C l | 6F o | 63 c | 61 a | 6C l | - 0010 - |
| 00 | 00 | 0C | 80 | 01 | 00 | 00 | 11 | 94 | 00 | 1D | 07 | 4D M | 79 y | 4D M | 65 e | - 0020 - |
| 64 d | 69 i | 61 a | 08 | 5F _ | 61 a | 69 i | 72 r | 70 p | 6C l | 61 a | 79 y | 04 | 5F _ | 74 t | 63 c | - 0030 - |
| 70 p | 05 | 6C l | 6F o | 63 c | 61 a | 6C l | 00 | 05 | 5F _ | 72 r | 61 a | 6F o | 70 p | 04 | 5F _ | - 0040 - |
| 74 t | 63 c | 70 p | 05 | 6C l | 6F o | 63 c | 61 a | 6C l | 00 | 00 | 0C | 80 | 01 | 00 | 00 | - 0050 - |
| 00 | 02 | 00 | 27 ' | 14 | 35 5 | 30 0 | 33 3 | 32 2 | 33 3 | 37 7 | 41 A | 44 D | 37 7 | 38 8 | 44 D | - 0060 - |
| 35 5 | 40 @ | 4D M | 79 y | 4D M | 65 e | 64 d | 69 i | 61 a | 05 | 5F _ | 72 r | 61 a | 6F o | 70 p | 04 | - 0070 - |
| 5F _ | 74 t | 63 c | 70 p | 05 | 6C l | 6F o | 63 c | 61 a | 6C l | 00 | 07 | 4D M | 79 y | 4D M | 65 e | - 0080 - |
| 64 d | 69 i | 61 a | 08 | 5F _ | 61 a | 69 i | 72 r | 70 p | 6C l | 61 a | 79 y | 04 | 5F _ | 74 t | 63 c | - 0090 - |
| 70 p | 05 | 6C l | 6F o | 63 c | 61 a | 6C l | 00 | 00 | 21 ! | 80 | 01 | 00 | 00 | 00 | 78 x | - 00A0 - |
| 00 | 15 | 00 | 00 | 00 | 00 | 1B | 58 X | 07 | 4D M | 79 y | 4D M | 65 e | 64 d | 69 i | 61 a | - 00B0 - |
| 05 | 6C l | 6F o | 63 c | 61 a | 6C l | 00 | 07 | 4D M | 79 y | 4D M | 65 e | 64 d | 69 i | 61 a | 08 | - 00C0 - |
| 5F _ | 61 a | 69 i | 72 r | 70 p | 6C l | 61 a | 79 y | 04 | 5F _ | 74 t | 63 c | 70 p | 05 | 6C l | 6F o | - 00D0 - |
| 63 c | 61 a | 6C l | 00 | 00 | 10 | 80 | 01 | 00 | 00 | 11 | 94 | 01 | 4E N | 05 | 61 a | - 00E0 - |
| 63 c | 6C l | 3D = | 30 0 | 1A | 64 d | 65 e | 76 v | 69 i | 63 c | 65 e | 69 i | 64 d | 3D = | 35 5 | 30 0 | - 00F0 - |
| 3A : | 33 3 | 32 2 | 3A : | 33 3 | 37 7 | 3A : | 41 A | 44 D | 3A : | 37 7 | 38 8 | 3A : | 44 D | 35 5 | 1B | - 0100 - |
| 66 f | 65 e | 61 a | 74 t | 75 u | 72 r | 65 e | 73 s | 3D = | 30 0 | 78 x | 35 5 | 41 A | 37 7 | 46 F | 46 F | - 0110 - |

-continued

| | | | | | | | | | | | | | | | | |
|---|---|---|---|---|---|---|---|---|---|---|---|---|---|---|---|---|
| 46 | 46 | 37 | 2C | 30 | 78 | 31 | 35 | 46 | 44 | 45 | 0A | 66 | 6C | 61 | 67 | - 0120 - |
| F | F | 7 | , | 0 | x | 1 | 5 | F | D | E | | f | l | a | g | -------- |
| 73 | 3D | 30 | 78 | 34 | 63 | 28 | 67 | 69 | 64 | 3D | 34 | 38 | 30 | 33 | 37 | - 0130 - |
| s | = | 0 | x | 4 | c | ( | g | i | d | = | 4 | 8 | 0 | 3 | 7 | -------- |
| 44 | 38 | 37 | 2D | 46 | 36 | 43 | 33 | 2D | 34 | 43 | 39 | 38 | 2D | 41 | 39 | - 0140 - |
| D | 8 | 7 | - | F | 6 | C | 3 | - | 4 | C | 9 | 8 | - | A | 9 | -------- |
| 45 | 35 | 2D | 42 | 41 | 38 | 42 | 36 | 39 | 31 | 34 | 46 | 46 | 38 | 33 | 05 | - 0150 - |
| E | 5 | - | B | A | 8 | B | 6 | 9 | 1 | 4 | F | F | 8 | 3 | | -------- |
| 69 | 67 | 6C | 3D | 31 | 06 | 67 | 63 | 67 | 6C | 3D | 31 | 10 | 6D | 6F | 64 | - 0160 - |
| i | g | l | = | 1 | | g | c | g | l | = | 1 | | m | o | d | -------- |
| 65 | 6C | 3D | 41 | 70 | 70 | 6C | 65 | 54 | 56 | 35 | 2C | 33 | 05 | 70 | 69 | - 0170 - |
| e | l | = | A | p | p | l | e | T | V | 5 | , | 3 | | p | i | -------- |
| 6E | 3D | 31 | 27 | 70 | 69 | 3D | 32 | 32 | 33 | 66 | 30 | 39 | 31 | 66 | 2D | - 0180 - |
| n | = | 1 | ' | p | i | = | 2 | 2 | 3 | f | 0 | 9 | 1 | f | - | -------- |
| 36 | 36 | 66 | 34 | 2D | 34 | 63 | 39 | 39 | 2D | 62 | 30 | 31 | 33 | 2D | 36 | - 0190 - |
| 6 | 6 | f | 4 | - | 4 | c | 9 | 9 | - | b | 0 | 1 | 3 | - | 6 | -------- |
| 65 | 37 | 39 | 63 | 63 | 38 | 62 | 37 | 30 | 33 | 39 | 28 | 70 | 73 | 69 | 3D | - 01A0 - |
| e | 7 | 9 | c | c | 8 | b | 7 | 0 | 3 | 9 | ( | p | s | i | = | -------- |
| 34 | 38 | 30 | 33 | 37 | 44 | 38 | 37 | 2D | 46 | 36 | 43 | 33 | 2D | 34 | 43 | - 01B0 - |
| 4 | 8 | 0 | 3 | 7 | D | 8 | 7 | - | F | 6 | C | 3 | - | 4 | C | -------- |
| 39 | 38 | 2D | 41 | 39 | 45 | 35 | 2D | 42 | 41 | 38 | 42 | 36 | 39 | 31 | 34 | - 01C0 - |
| 9 | 8 | - | A | 9 | E | 5 | - | B | A | 8 | B | 6 | 9 | 1 | 4 | -------- |
| 46 | 46 | 38 | 33 | 43 | 70 | 6B | 3D | 65 | 36 | 63 | 61 | 31 | 34 | 39 | 35 | - 01D0 - |
| F | F | 8 | 3 | C | p | k | = | e | 6 | c | a | 1 | 4 | 9 | 5 | -------- |
| 38 | 37 | 31 | 31 | 61 | 37 | 35 | 64 | 65 | 35 | 38 | 31 | 35 | 63 | 64 | 30 | - 01E0 - |
| 8 | 7 | 1 | 1 | a | 7 | 5 | d | e | 5 | 8 | 1 | 5 | c | d | 0 | -------- |
| 30 | 32 | 36 | 35 | 38 | 66 | 33 | 35 | 39 | 31 | 37 | 34 | 32 | 31 | 66 | 33 | - 01F0 - |
| 0 | 2 | 6 | 5 | 8 | f | 3 | 5 | 9 | 1 | 7 | 4 | 2 | 1 | f | 3 | -------- |
| 62 | 64 | 65 | 64 | 34 | 33 | 65 | 33 | 39 | 33 | 65 | 63 | 61 | 37 | 33 | 61 | - 0200 - |
| b | d | e | d | 4 | 3 | e | 3 | 9 | 3 | e | c | a | 7 | 3 | a | -------- |
| 65 | 34 | 36 | 63 | 36 | 35 | 39 | 65 | 10 | 73 | 72 | 63 | 76 | 65 | 72 | 73 | - 0210 - |
| e | 4 | 6 | c | 6 | 5 | 9 | e | | s | r | c | v | e | r | s | -------- |
| 3D | 33 | 35 | 34 | 2E | 35 | 36 | 2E | 37 | 0D | 6F | 73 | 76 | 65 | 72 | 73 | - 0220 - |
| = | 3 | 5 | 4 | . | 5 | 6 | . | 7 | | o | s | v | e | r | s | -------- |
| 3D | 31 | 31 | 2E | 32 | 2E | 31 | 04 | 76 | 76 | 3D | 32 | 07 | 4D | 79 | 4D | - 0230 - |
| = | 1 | 1 | . | 2 | . | 1 | | v | v | = | 2 | | M | y | M | -------- |
| 65 | 64 | 69 | 61 | 0C | 5F | 64 | 65 | 76 | 69 | 63 | 65 | 2D | 69 | 6E | 66 | - 0240 - |
| e | d | i | a | | _ | d | e | v | i | c | e | - | i | n | f | -------- |
| 6F | 04 | 5F | 74 | 63 | 70 | 05 | 6C | 6F | 63 | 61 | 6C | 00 | 00 | 10 | 80 | - 0250 - |
| o | | _ | t | c | p | | l | o | c | a | l | | | | | -------- |
| 01 | 00 | 00 | 00 | 02 | 00 | 0D | 0C | 6D | 6F | 64 | 65 | 6C | 3D | 4A | 34 | - 0260 - |
| | | | | | | | | m | o | d | e | l | = | J | 4 | -------- |
| 32 | 64 | 41 | 50 | 14 | 35 | 30 | 33 | 32 | 33 | 37 | 41 | 44 | 37 | 38 | 44 | - 0270 - |
| 2 | d | A | P | | 5 | 0 | 3 | 2 | 3 | 7 | A | D | 7 | 8 | D | -------- |
| 35 | 40 | 4D | 79 | 4D | 65 | 64 | 69 | 61 | 05 | 5F | 72 | 61 | 6F | 70 | 04 | - 0280 - |
| 5 | @ | M | y | M | e | d | i | a | | _ | r | a | o | p | | -------- |
| 5F | 74 | 63 | 70 | 05 | 6C | 6F | 63 | 61 | 6C | 00 | 00 | 21 | 80 | 01 | 00 | - 0290 - |
| _ | t | c | p | | l | o | c | a | l | | | ! | | | | -------- |
| 00 | 00 | 02 | 00 | 15 | 00 | 00 | 00 | 00 | 1B | 58 | 07 | 4D | 79 | 4D | 65 | - 02A0 - |
| | | | | | | | | | | X | | M | y | M | e | -------- |
| 64 | 69 | 61 | 05 | 6C | 6F | 63 | 61 | 6C | 00 | 14 | 35 | 30 | 33 | 32 | 33 | - 02B0 - |
| d | i | a | | l | o | c | a | l | | | 5 | 0 | 3 | 2 | 3 | -------- |
| 37 | 41 | 44 | 37 | 38 | 44 | 35 | 40 | 4D | 79 | 4D | 65 | 64 | 69 | 61 | 05 | - 02C0 - |
| 7 | A | D | 7 | 8 | D | 5 | @ | M | y | M | e | d | i | a | | -------- |
| 5F | 72 | 61 | 6F | 70 | 04 | 5F | 74 | 63 | 70 | 05 | 6C | 6F | 63 | 61 | 6C | - 02D0 - |
| _ | r | a | o | p | | _ | t | c | p | | l | o | c | a | l | -------- |
| 00 | 00 | 10 | 80 | 01 | 00 | 00 | 00 | 02 | 00 | C0 | 0A | 63 | 6E | 3D | 30 | - 02E0 - |
| | | | | | | | | | | | | c | n | = | 0 | -------- |
| 2C | 31 | 2C | 32 | 2C | 33 | 07 | 64 | 61 | 3D | 74 | 72 | 75 | 65 | 08 | 65 | - 02F0 - |
| , | 1 | , | 2 | , | 3 | | d | a | = | t | r | u | e | | e | -------- |
| 74 | 3D | 30 | 2C | 33 | 2C | 35 | 15 | 66 | 74 | 3D | 30 | 78 | 35 | 41 | 37 | - 0300 - |
| t | = | 0 | , | 3 | , | 5 | | f | t | = | 0 | x | 5 | A | 7 | -------- |
| 46 | 46 | 46 | 46 | 37 | 2C | 30 | 78 | 31 | 35 | 46 | 44 | 45 | 07 | 73 | 66 | - 0310 - |
| F | F | F | F | 7 | , | 0 | x | 1 | 5 | F | D | E | | s | f | -------- |
| 3D | 30 | 78 | 34 | 63 | 08 | 6D | 64 | 3D | 30 | 2C | 31 | 2C | 32 | 0D | 61 | - 0320 - |
| = | 0 | x | 4 | c | | m | d | = | 0 | , | 1 | , | 2 | | a | -------- |
| 6D | 3D | 41 | 70 | 70 | 6C | 65 | 54 | 56 | 35 | 2C | 33 | 43 | 70 | 6B | 3D | - 0330 - |
| m | = | A | p | p | l | e | T | V | 5 | , | 3 | C | p | k | = | -------- |
| 65 | 36 | 63 | 61 | 31 | 34 | 39 | 35 | 38 | 37 | 31 | 31 | 61 | 37 | 35 | 64 | - 0340 - |
| e | 6 | c | a | 1 | 4 | 9 | 5 | 8 | 7 | 1 | 1 | a | 7 | 5 | d | -------- |
| 65 | 35 | 38 | 31 | 35 | 63 | 64 | 30 | 30 | 32 | 36 | 35 | 38 | 66 | 33 | 35 | - 0350 - |
| e | 5 | 8 | 1 | 5 | c | d | 0 | 0 | 2 | 6 | 5 | 8 | f | 3 | 5 | -------- |
| 39 | 31 | 37 | 34 | 32 | 31 | 66 | 33 | 62 | 64 | 65 | 64 | 34 | 33 | 65 | 33 | - 0360 - |
| 9 | 1 | 7 | 4 | 2 | 1 | f | 3 | b | d | e | d | 4 | 3 | e | 3 | -------- |
| 39 | 33 | 65 | 63 | 61 | 37 | 33 | 61 | 65 | 34 | 36 | 63 | 36 | 35 | 39 | 65 | - 0370 - |
| 9 | 3 | e | c | a | 7 | 3 | a | e | 4 | 6 | c | 6 | 5 | 9 | e | -------- |
| 06 | 74 | 70 | 3D | 55 | 44 | 50 | 08 | 76 | 6E | 3D | 36 | 35 | 35 | 33 | 37 | - 0380 - |
| | t | p | = | U | D | P | | v | n | = | 6 | 5 | 5 | 3 | 7 | -------- |

-continued

| 0B | 76 | 73 | 3D | 33 | 35 | 34 | 2E | 35 | 36 | 2E | 37 | 09 | 6F | 76 | 3D | - 0390 - |
|    | v  | s  | =  | 3  | 5  | 4  | .  | 5  | 6  | .  | 7  |    | o  | v  | =  |          |
| 31 | 31 | 2E | 32 | 2E | 31 | 04 | 76 | 76 | 3D | 32 | 07 | 4D | 79 | 4D | 65 | - 03A0 - |
| 1  | 1  | .  | 2  | .  | 1  |    | v  | v  | =  | 2  |    | M  | y  | M  | e  |          |
| 64 | 69 | 61 | 05 | 6C | 6F | 63 | 61 | 6C | 00 | 00 | 1C | 80 | 01 | 00 | 00 | - 03B0 - |
| d  | i  | a  |    | l  | o  | c  | a  | l  |    |    |    |    |    |    |    |          |
| 00 | 02 | 00 | 10 | FE | 80 | 00 | 00 | 00 | 00 | 00 | 00 | 0C | DB | 41 | 2F | - 03C0 - |
|    |    |    |    |    |    |    |    |    |    |    |    |    |    | A  | /  |          |
| 68 | 20 | 71 | CB | 07 | 4D | 79 | 4D | 65 | 64 | 69 | 61 | 05 | 6C | 6F | 63 | - 03D0 - |
| h  |    | q  |    |    | M  | y  | M  | e  | d  | i  | a  |    | l  | o  | c  |          |
| 61 | 6C | 00 | 00 | 01 | 80 | 01 | 00 | 00 | 00 | 02 | 00 | 04 | 0A | 0A | 0A | - 03E0 - |
| a  | l  |    |    |    |    |    |    |    |    |    |    |    |    |    |    |          |
| 64 |    |    |    |    |    |    |    |    |    |    |    |    |    |    |    | - 03F0 - |

As shown in the above, the altered packet in this example also has the name changed by the controller 106 and the altered packet is configured to not contain "name compression". For this reason, the full name of the record is shown. On the original packet, there are certain bytes such as C0 15 such as the case at byte 003B (row 0030, 11 bytes to the right). These bytes are utilized so that _raop._tcp._Bedroom.local does not need to be repeated everywhere. The C0 15 points to the location of the extra data for the full name, in this case byte 0x15 (byte 21), which in this case is 04 5F, seen on the 0010 row. However, in other embodiments, name compression may again be utilized and performed by the controller 106 after changing the names in the response.

In addition to changing the name and above related packet data in the modified response packet sent at steps 306, 316, the modified packet is also altered at these steps to have some TTL values reduced. This change can be seen at the bytes after the record name. For example, at 003B (see row 0030) of the original packet which is _raop (05 5F 72 61 6F 70 C0 15) there are the following bytes:

00 0C 00 01 00 00 11 94 00 17 . . .

These can be broken up as follows:

| Bytes | Description |
|-------|-------------|
| 00 0C | DNS Record TYPE short (short is 2 bytes long). This indicates a PTR record. |
| 00 01 | DNS Record CLASS short. This is an IN (or internet) class. Atypical MDNS record is an IN Class record. Sometimes this is 80 01 which indicates the "Cache Flush" bit is set which is to tell the receiver that this is new data and to flush what it had in the cache prior to this. |
| 00 00 11 94 | Time To Live (TTL) long (long is 4 bytes long). The value of 11 94 represents a Time to Live of 4500 seconds. |
| 00 17... | Data Length short-the length of the data for this record. In this case 23 bytes long. Which is the 14 39 30. |

For the ALTERED packet side, the controller 106 changes the TTL long value to be 00 00 00 02 for two seconds. This is seen above in the altered packet at byte 005E, 5F, 60, 61 (see the bytes spanning between rows 0050 and 0060). These are the bytes the controller 106 changes in order to reduce the TTL value for this record.

Of note, in this embodiment, the controller 106 only changes the TTL on the various resource records that do not contain a service name with "airplay" in it. This is beneficial to help ensure that the name of the device 104 remains in the Airplay menu on the iOS device 116.

The following is an example of the above modified response packet at steps 306, 316 of this example looks in a summarized form:

Questions : 0
NONE
Answers : 2
_airplay._tcp.local (an00) - PTR - TTL:4500 DATA : CF : true, Domain name: MyMedia._airplay._tcp.local
_raop._tcp.local (an01) - PTR - TTL:2 DATA : CF : true, Domain name: 503237AD78D5@MyMedia._raop._tcp.local
Nameservers : 0
NONE
Additional Records : 7
MyMedia._airplay._tcp.local (ad00) - SRV - TTL:120 DATA : CF : true, Priority 0, Weight 0, Port 7000, target MyMedia.local
MyMedia._airplay._tcp.local (ad01) - TXT - TTL:4500 DATA : CF: true, TXT entries : 15 -- ATV Version : AppleTV5,3
MyMedia._device-info._tcp.local (ad02) - TXT - TTL:2 DATA : CF : true, TXT entries : 1 -- ATV Version : J42dAP
503237AD78D5@MyMedia._raop._tcp.local (ad03) - SRV - TTL:2 DATA : CF : true, Priority 0, Weight 0, Port 7000, target MyMedia.local
503237AD78D5@MyMedia._raop._tcp.local (ad04) - TXT -TTL:2 DATA : CF : true, TXT entries : 13 -- ATV Version : AppleTV5,3
MyMedia.local (ad05) - AAAA - TTL:2 DATA : CF : true, IPv6 : FE80:0000:0000:0000:0CDB:412F:6820:71CB
MyMedia.local (ad06) - A - TTL:2 DATA : CF : true, IPv4 : 10.10.10.100

Normally the TTL values in the original response packets are all "4500" and "120". The value of "120" is used mostly for the SRV and A/AAAA records but not always. The values "4500" and "120" that are typically used by the AppleTVs 104 correspond to 1 hour 15 minutes and 2 minutes, respectively. As shown the TTL value for records without "airplay" in the record name are altered by the controller 104 at steps 306, 316 in this embodiment to be the value of "2", which corresponds to two seconds.

Concerning steps 302, 304, 306, these are steps are collectively referred to as the initial media device discovery and announcement process 330 performed after the server application starts on the controller. Although shown in FIG. 3 as a query to a selected media device 104, in some embodiments, the discovery process 330 is utilized to gather the information from all the media devices 104. This is achieved by the controller 106 sending out a single multicast to the VLAN-media network at step 304. This single multicast queries for service providing devices 104 supporting a desired protocol such as AppleTVs supporting AirPlay. The controller 106 then gathers all the responses, modifying for reduced TTL values, and storing. The discover process 330 does not require an MDNS query to happen first from a user device 116. Likewise, whether or not to send out the multicast announcement of the modified details of a selected media device 104 at step 306 is also omitted in some embodiments. The normal process that loops in response to MDNS queries received from user devices 116 beings at step 308. In some embodiments, the entire media device discovery and announcement process 330 can be omitted; instead, the controller 106 queries the media devices 104 every time.

Figure 4:
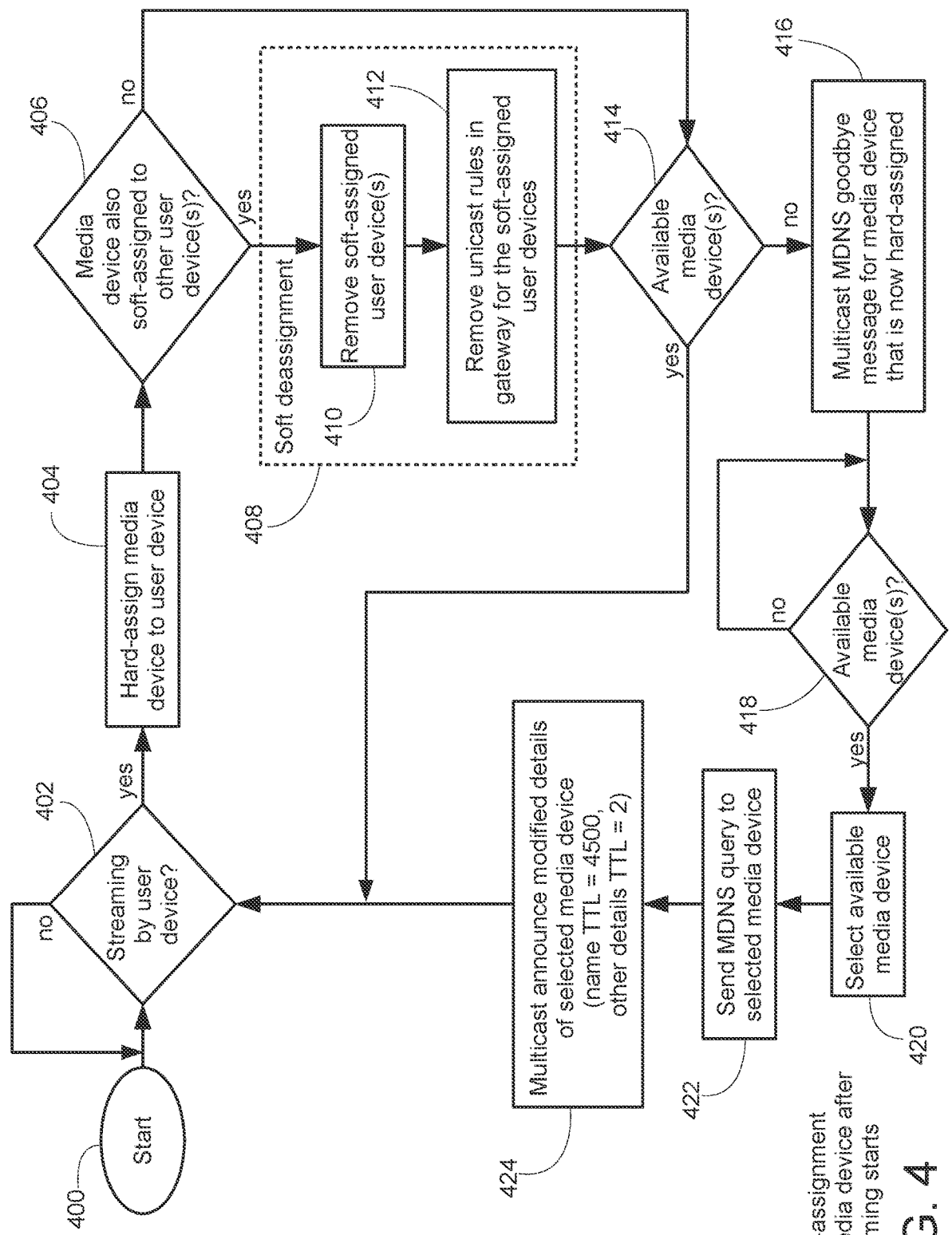
FIG. 4 illustrates a flowchart of operations performed by the controller in order to hard assign a media device to a user device after detecting that the network-based media streaming protocol is actually being utilized between the two devices according to an exemplary embodiment.

FIG. 4 illustrates a flowchart of operations performed by the controller 106 in order to hard-assign a media device 104 to a user device 116 after detecting that the network-based media streaming protocol is actually being utilized between the two devices 104, 116 according to an exemplary embodiment. The steps of FIG. 4 may be performed by processors 208 of the controller 106 by executing instructions of the MDNS proxy module 114 and/or gateway module 112. In some embodiments, the process of FIG. 4 is performed by the controller 106 in parallel with the process of FIG. 3, for example performed at the same time on different cores or by multitasking operations of a single core. The steps of the flowchart are not restricted to the exact order shown, and, in other configurations, shown steps may be omitted or other intermediate steps added.

The process of FIG. 4 starts at step 400, which, in some embodiments, similar to step 300 of FIG. 3 occurs at power up or reboot of the controller 106.

At step 402, the controller 106 determines whether or not streaming is occurring between a user device 116 and a media device 104 to which the user device 116 is currently soft-assigned. In this embodiment, when a media device 104 is soft-assigned to a user device 116, this means (as a result of step 318) that the user device 116 and the media device 104 can communicate with each other utilizing unicast network communications via the gateway 112. The controller 106 therefore monitors known ports related to the network-based media streaming protocol to detect events that signal the start of the user device 116 actually utilizing the streaming protocol with a media device 104 (or actually using some resource provided by the media device 104) to which it is currently softly assigned. Again taking the example that the protocol is AirPlay®, the controller 106 in some embodiments monitors for a solicited or unsolicited "itunes control" MDNS control message that occurs at the start of an AirPlay® session to any of the media device(s) 104 in the system 100 that are currently soft-assigned to at least one user device 116. In this way, the controller 106 can detect that the user device 116 is beginning to stream or otherwise initiate AirPlay® functionality on the media device 104 to which the user device 116 is soft-assigned.

When the protocol or service is known in advance, the starting triggers can be specific such as looking for specific packets or network activity that is known to trigger the start of a session. However, other ways of detecting whether streaming or other services are beginning are also possible. For instance, in some embodiments, simple packet counts over a given unit time between the user device 116 and the soft-assigned media device 104 may be utilized. If the number of packets that are sent between the user device 116 and the media device 104 exceeds a threshold count in a duration of X seconds (e.g., two seconds), the controller 106 will determine that the user device 116 is actually utilizing a service provided by the media device 104. Packets between the two devices 104, 116 can be detected by the controller 106 examining the source and destination address fields of each packet passing through the gateway 112 to look for packets that have source address of the user device 116 and destination address of the media device 104, and vice versa. In another example, amount of data transferred over X seconds (e.g., two seconds) between the user device 116 and the media device 104, is utilized—over a threshold amount of data indicates to the controller 106 that the user device 116 has begun utilizing a service of the media device 104. Any desired interaction between the user device 116 and the media device 104 as detected by monitoring network traffic at the gateway 112 can be utilized by the controller 106 to detect streaming (or other services) at step 402. Likewise, similar characteristics of network traffic (and/or absence thereof) can also be utilized by the controller 106 to detect the end of a stream.

At step 404, the controller 106 updates the media device assignments table 212 to indicate that the media device 104 used by the user device 116 as detected at step 402 is now hard-assigned to the user device 116. This step involves the controller 106 changing the soft assignment to a hard assignment between the user device 116 and the media device 104 in the media device assignments table 212. While hard-assigned to the user device 116, the media device 104 will no longer be considered an "available media device" at steps 302 and 312 previously described for FIG. 3.

At step 406, the controller 104 queries the media device assignments table 212 to determine whether the media device 104 that was hard-assigned at step 404 was previously soft-assigned to any other user devices 116. When yes, control proceeds to step 408; otherwise, control proceeds to step 414.

At step 408, the controller 106 de-assigns the media device 104 from each of the other user devices 116. This step is subdivided into two sub-steps as follows:

At step 410, the controller 106 removes the soft assignment of the media device 104 in question to the other user devices 116. For instance, it may be case that five different user devices 116 all made MDNS queries and were soft-assigned to a single media device 104—this may occur as a result of each of the five MDNS queries proceeding from step 308 (when they are received by the controller 106) to step 320 (when the controller 106 soft assigns a same available media device 104 to each different user device 116). If that same media device 104 is then hard-assigned to one of the five user devices 116 (at step 404), the controller 106 will at step 408 find the other four user devices 116 that were soft-assigned that same media device 104 and remove the soft assignment from the table 212. This can be done by querying the media device assignments table 212 to look for and remove the soft assignment of the media device 104 in question to the other user devices 116.

At step 412, the controller 106 removes the unicast network traffic rules from the gateway/firewall rules 210 between the media device 104 in question and each of the user devices 116 that had their soft assignment removed at step 410. Continuing the above example, assuming there were four other user devices 116 soft-assigned the media device 104, the controller 106 removes the unicast rules between these four user devices 116 and the media device 104 from the gateway/firewall rules 210. After this is done, the gateway 112 will no longer pass unicast network traffic between these user devices 116 and the media device 104. Specifically, when a packet does not match a specific "pass" rule allowing the traffic, the gateway 112 by default blocks the packet from passing between VLAN-guest 108 and VLAN-media 110. It is thereby not possible for these other user devices 116 to disrupt the network-based media streaming protocol operations being performed by the user device 116 that is currently hard-assigned to the media device 104.

At step 414, the controller 106 checks whether there are still any available media device(s) 104. Since a new media device 104 has now been hard-assigned, it is possible there are no longer any available media devices 104 left in system 100. Again, available media devices 104 in this embodiment refer to media devices 104 that are not currently hard-assigned to one or more user devices 116. This step may be performed by the controller 106 querying the media device assignment table 212 to check for any media devices 104 that are not hard-assigned. If there is at least one available media device 104 in the list (i.e., a media device 104 not hard-assigned to a user device 116), control returns to step 402 to continue monitoring the soft-assigned media devices 104 to detect when one of them is starting to be used by a user device 116. Alternatively, if all media devices 104 are now hard-assigned to at least one user device 116, this means there are no available media devices 104 left and control proceeds to step 416.

At step 416, the controller 106 multicasts an MDNS goodbye message for the media device 104 that was hard-assigned at step 404. This media device 104 is the last media device 104 to be available and it is no longer available; thus, at this point in time there are no more media devices 104 available in system 100. Since there is no chance that streaming can work for any user devices 116 not currently streaming, the MDNS goodbye message is sent by the controller 106 at step 416 to effectively inform all the remaining user devices 116 to remove the AirPlay icon they may be displaying on their user interface(s). In this way, human users will know it is not currently possible to utilize the network-based media sharing protocol because there is no longer an icon showing available media devices 104 within their applications on the user device 116. The human users are beneficially not bothered trying to click an icon and stream when there are no longer any available media devices 104 left and the streaming connection requests will simply time out. Again, sending of the MDNS goodbye message at this step is optional and may be omitted in some embodiments.

At step 418, the controller 106 checks whether there is now an available media device 104. Again, this step involves the controller 106 querying the media device assignments table 212 to look for a media device 104 that is not currently hard-assigned to any user device 116. Any such media device(s) 104 are available for hard assignment. When there is at least one such available media device 104, control proceeds to step 420; otherwise, if all media devices 104 are unavailable (i.e., all are hard-assigned to at least one user device 116), control stays at step 418 while the controller 106 waits for at least one media device 104 to become available.

At step 420, the controller 106 selects one of the available media device(s) 104 found at step 418. This step is very similar to that previously described at step 302 so a repeated description is omitted here for brevity.

At step 422, the controller 106 sends an MDNS query to the media device 104 selected at step 418 requesting resource record details via VLAN-media 110. This step is very similar to that previously described at step 304 so a repeated description is omitted here for brevity.

At step 424, the controller 106 sends a modified MDNS announcement on VLAN-guest 108 providing details of the selected media device 104 with the resource record(s) having the service name in question (e.g., "airplay") having a long TTL value such as "4500" seconds (and/or "120' seconds) and resource records such as the address records that do not include the service name having shortened TTLs such as two seconds. This step is very similar to that previously described at steps 306, 316 so a repeated description is omitted here for brevity.

After step 424, control returns to step 402 to again monitor when a user device 116 actually starts utilizing the service of one of the softly assigned media devices 104.

Steps 420, 422, and 424 result in the user devices 116 updating their UIs to include the icon corresponding to the selected media device 104 on their applications. In other words, once an available media device 104 is determined at step 418, the controller 106 gathers up details of that media device 104 and sends out a multicast announcement of its availability to the user devices 116 on VLAN-guest 108. Because the TTL of the address record is only 2 seconds, unless a user device 116 immediately begins communicating with the address of the selected media device 104, the user devices 116 will need to individually make a subsequent MDNS query in the future to obtain the actual IP address of the media device 104. Beneficially, the AirPlay® icon reappears on the UI of the user device 116 after step 424 and stays indicating availability of the service (e.g., AirPlay®) because the name record has a much longer TTL such as 4500 seconds. Upon a human user clicking the icon to actually utilize the "airplay" service on a particular user device 116, the subsequent MDNS query sent by the user device 116 to obtain the address records will be received by the controller 106 at step 308.

In the embodiment shown above in FIG. 3 and FIG. 4, after steps 306 and 424, the newly announced media device 104 may not actually be soft-assigned to any user devices 116 and thus any user device(s) 116 that attempt within two seconds to stream to the address of said announced media device 104 will fail to establish a connection. In many cases this is not a problem because two seconds is not enough time for the MDNS query to be received, processed, the AirPlay® menu populated, and the user to click the icon. As soon as the two seconds are up, the MDNS address record expires and the user device 116 will thereafter be required to send an MDNS query asking for the details. In the rare case where the unsolicited MDNS response sent at steps 306 and 424 results in a human user immediately (within 2 seconds) clicking the icon of the media device 104 on their user device 116 to initiate streaming, the user will end up waiting approximately four to ten seconds for the user device 116 to timeout on initial connection request, resend an MDNS query (received by the controller 106 at step 308), and then be soft-assigned following the process of FIG. 3 in order to enable unicast communications. From this point forward, the user device 116 will be able to communicate with the media device 104 and streaming will work. As explained further with respect to the timeout expiry timer of step 904 in FIG. 9, there is also at least a thirty-second timeout where the user device 116 will ignore the specific media device 104 for which it failed communications with.

To avoid this delay for a really quick user that tries to connect to the newly announced media device 104 within two seconds of steps 306 or 424, steps 306 and 424 may be further modified to include softly assigning the media device 104 to one or more known user devices 116 on the VLAN-guest network 108. In this way, the gateway rules 210 will be ready and the soft assignment done so that any unicast connection request from the user device 116 to the newly announced media device 104 will immediately work. The known user devices 116 may be all user devices 116 detected by the controller 106 on VLAN-guest 108 that are not currently soft-assigned any particular media device 104. Alternatively, the known user devices 116 may be a subset of all unassigned user devices 116 such as only the unassigned user devices 116 that active within a predetermined period, non-expired, checked in, authorized, authenticated, associated with a guest room, etc.

Figure 5:
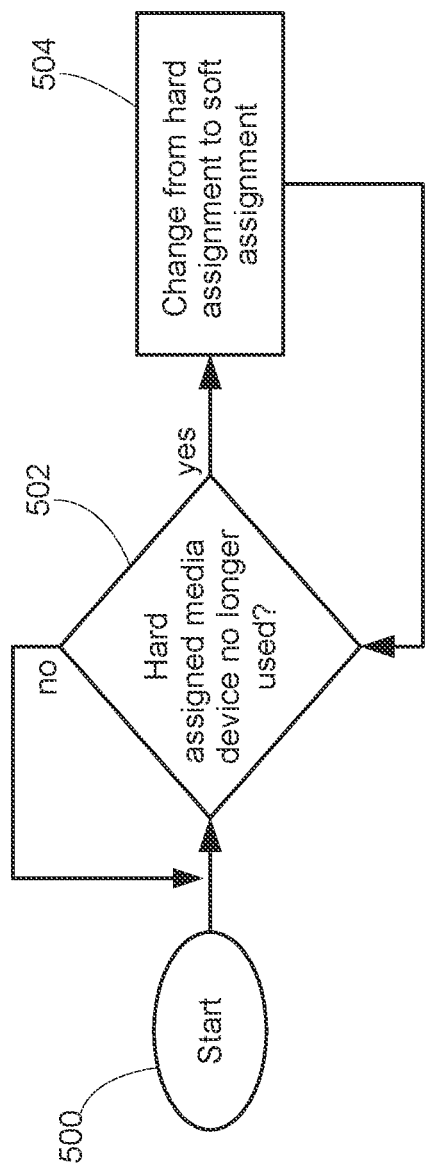
FIG. 5 illustrates a flowchart of operations performed by the controller in order to reset assignment from hard back to soft when detecting that the network-based media streaming protocol is no longer being utilized between a user device and a hard-assigned media device according to an exemplary embodiment.

FIG. 5 illustrates a flowchart of operations performed by the controller 106 in order to reset assignment from hard back to soft when detecting that the network-based media streaming protocol is no longer being utilized between a user device 116 and a hard-assigned media device 104 according to an exemplary embodiment. The steps of FIG. 5 may be performed by processors 208 of the controller 106 by executing instructions of the MDNS proxy module 114 and/or gateway module 112. In some embodiments, the process of FIG. 5 is performed by the controller 106 in parallel with the processes of FIGS. 3 and 4, for example performed at the same time on different cores or by multitasking operations of a single core. The steps of the flowchart are not restricted to the exact order shown, and, in other configurations, shown steps may be omitted or other intermediate steps added.

The process of FIG. 5 starts at step 500, which, in some embodiments, similar to step 300 of FIG. 3 and step 400 of FIG. 4 occurs at power up or reboot of the controller 106.

At step 500, the controller 106 queries the media device assignments table 212 to determine whether there are any hard-assigned media devices 104 that are no longer being utilized by the user device 116 to which they are hard-assigned. In some embodiments, this step is performed in a similar manner to step 402 but looking for opposite conditions (i.e., indicating non-use instead of use). For instance, the absence of any packets between the IP address of a user device 116 and the IP address the hard-assigned media device 104 for that user device 116 over a period of time such as X (e.g., 30 seconds) indicates the user device 116 is no longer utilizing the media device 104. Likewise, if the protocol (e.g., AirPlay®) being utilized between the two devices 104, 116 is known, the controller 106 may monitor specific ports and packet types/content to detect when the streaming session is finished. For instance, in some embodiments, the controller 106 monitors port 7000 to detect a heartbeat packet being transmitted roughly every two seconds as long as the AirPlay® session is in use between the user device 116 and its hard-assigned media device 104. If there are no heartbeat packets sent after a threshold number of seconds such as ten seconds, this means the AirPlay® session has ended. When a hard-assigned media device 104 is no longer being utilized by the user device 116 to which the media device 104 is assigned, control proceeds to the step 504; otherwise, if all hard-assigned media devices 104 are still being utilized by their respective user devices 116, control stays at step 502 to continue monitor for usage of at least one of the media devices 104 to end.

Another method for determining if streaming has stopped is that a Goodbye MDNS packet (TTL=0) for the "iTunes_Ctrl" or "dacp"service (iTunes_Ctrl is a dacp service) is sent by either the user device 116 or media device 104. The controller 106 may monitor for these messages such as by monitoring for them from the user device 116. A benefit of this is that no packet sniffing is required, which reduces CPU load as long as the AirPlay® specification continues to require this behavior from user devices 116. The controller 104 may monitor for that traffic and if it sees either of those devices 104, 116 sending a goodbye packet for the dacp service then it knows AirPlay has stopped.

At step 504, the controller 106 changes the assignment association between the user device 116 and the media device 104 that was detected at step 502 from a hard assignment to a soft assignment. In other words, although the user device 116 can still communicate utilizing unicast traffic to the media device 104, the media device 104 is again considered by the controller 106 to be available for hard assignment to other user devices 116. Previously described steps 302, 310, 312, 414 and 418 will thereby find the media device 104 to be an available media device 104 after step 504. Control then returns back to step 502 to monitor for a next hard-assigned media device 104 to no longer be used.

In some embodiments, the IP address record of the AppleTV has a two second timeout (TTL=2) as set by the proxy controller 106 response at steps 306, 316, 424. So whenever AirPlay® is used by a user, the iOS device 116 will query for that IP address info and the controller 106 gives it the correct IP of the soft assigned AppleTV 104 (which may in some cases be a different IP address than the proxy 114 had given some time earlier because that other AppleTV 104 is now hard assigned). Opening up the unicast rules 210 during soft assignment is okay in some embodiments because the iOS devices 116 which have been soft assigned the AppleTV 104 will still make a new MDNS request later if they actually want to use it greater than two seconds later. The only issue would be if the proxy 114 sent out two responses to two different iOS devices 116 within two seconds—this could allow a race condition. To avoid the race condition in some embodiments, the controller 106/proxy 114 spaces out the MDNS responses at steps 306, 316, 424 by at least two seconds, i.e., the response sent by the controller 106 at one of steps 306, 316, 424 is at least two second later than a previous response sent by the controller 106 at one of at steps 306, 316, 424. The two second spacing matches the TTL value that was used and helps avoid the race condition by encouraging one and only one user device 116 to start utilizing an AppleTV (or other media device 104) at any given time. For example, if two user devices 116 make queries for AppleTV 104 which are received by the controller 106 at step 308, the controller 106 will stagger the unicast replies to these two user devices 116 at step 316 by at least two seconds. The first user device 116 gets the reply at step 316 and has a two second opportunity to start using the selected media device 104, then the second user device 116 gets the reply at step 316 and has a two second opportunity.

In some embodiments, the controller 106 provides the user device 116 with updated records for RAOP and even the Airplay records in the same packet. So even though it requested a packet just for the A/AAAA or SRV records, the controller 106 can give it all the other records too with the cacheflush bit set. The iOS device 116 also typically queries for the RAOP record as well. Just depends on which one it wants first (A/AAAA or raop)—there is a multithreaded process running on the iOS device 116. In other embodiments, other records may be queried first such as may be beneficial to support future versions of AirPlay®. In general, the first records are not limited to just A/AAAA and raop.

Figure 6:
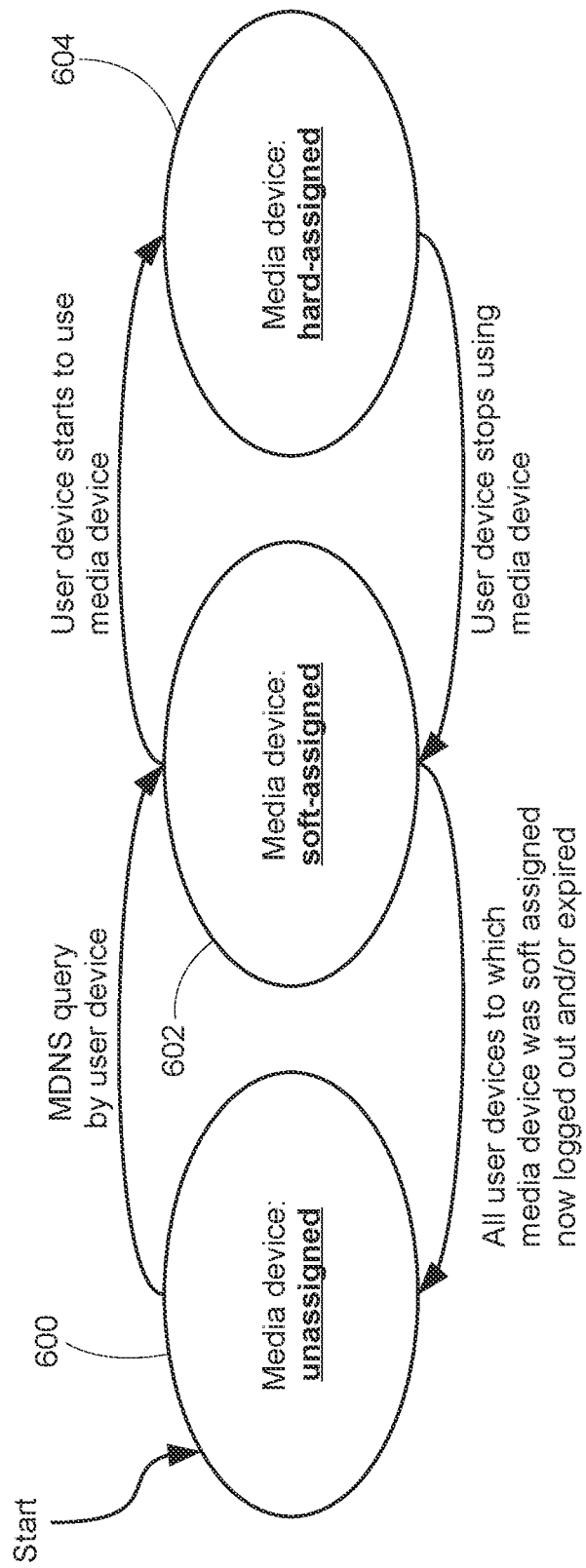
FIG. 6 illustrates a state transition diagram of media device assignment states according to an exemplary embodiment.

FIG. 6 illustrates a state transition diagram of media device 104 assignment states. As illustrated, each media device 104 in this embodiment can be in one of three states: unassigned 600, soft-assigned 602, and hard-assigned 604. In the unassigned state 600, the media device 104 is available but is not linked to any specific user device(s) 116 and none of the user devices 116 can communicate with the unassigned media device 104 (because there are no unicast network rules between the user devices 116 and the unassigned media device 104 in the gateway/firewall rules 210). This is the starting state for each media device 104 after power up of the system 100. When unassigned 600, the media device 104 is ready for soft assignment. Transition to the soft-assigned state 602 occurs in response to the controller 106 receiving an MDNS query by a user device 116.

In the soft-assigned state 602, there is at least one user device 116 associated with the media device 104 in a so-called soft manner. The assignment is considered soft because the controller 106 is free to associate additional user devices 116 with the media device 104 in a similar soft manner at any time. While softly assigned to a particular user device 116, unicast rules are added the gateway/firewall rules 210 to enable bidirectional unicast network traffic between the media device 104 and all the user devices 116 to which the media device 104 is softly assigned. When softly assigned, the media device 104 is ready for hard assignment. Transition to the hard-assigned state 604 occurs in response to a user device 116 starting to actually use the media device 104.

In the hard-assigned state 604, there is again at least one user device 116 associated with the media device 104; however, the media device 104 is no longer considered available for assignment to additional user devices 116. Instead, the hard assignment 604 is similar to a reservation or guarantee of the media device 104 for one or more specific user devices 116.

In some embodiments, each media device 104 can only be hard-assigned to one user device 116 at a time and any other user devices 116 to which the media device 104 was previously softly assigned are automatically deassigned when the transition to hard assignment 604 occurs. See the soft deassignment performed at step 408 of FIG. 4, for example. However, in some embodiments, it is permissible to hard assign a single media device 104 to multiple user devices 116. This may be desirable, for example, when a plurality of user devices 116 are all associated with a same guest room 124 of a hospitality establishment 101. In this case, the subset of the user devices 116 associated with the same guest room 124 may simply compete with each other for usage of the single media device 104 in a similar manner as they would in a residential environment. However, in some embodiments, regardless of whether the media device 104 is hard-assigned to one or more user devices, once hard-assigned, the media device 104 is not available for further hard assignment to other user devices 116.

While hard-assigned 604, only the user device(s) 116 to which the media device 104 is hard-assigned can communicate utilizing unicast network traffic with the media device 104 via the gateway 112. All other user devices 116 for which the media device 104 is not hard-assigned are prevented from communicating with the media device 104 by the controller 106. The media device 104 stays in the hard-assigned state 604 in some embodiments until the one or more user devices 116 stop utilizing the media device 104. At this point in time, the state of the media device 104 transitions back to soft-assigned 602 where, by default, the media device 104 becomes soft-assigned to the user device(s) 116 to which it was previously hard-assigned. In this way, those same one or more user device(s) 116 can still communicate utilizing unicast network traffic with the media device 104 such as to restart streaming content, but the media device 104 is also available for soft assignment to other user devices 116 and those other user devices 116 may also initiate streaming.

The transition from the soft-assigned state 602 back to unassigned 600 occurs when the media device 104 is no longer soft-assigned to any user devices 116. This typically would occur when all the user devices 116 to which the media device 104 was previously soft-assigned have logged out of the network 108 or are otherwise expired such as from inactivity, time limits, checkout by their associated from the hotel guest room 124, etc.

Figure 7:
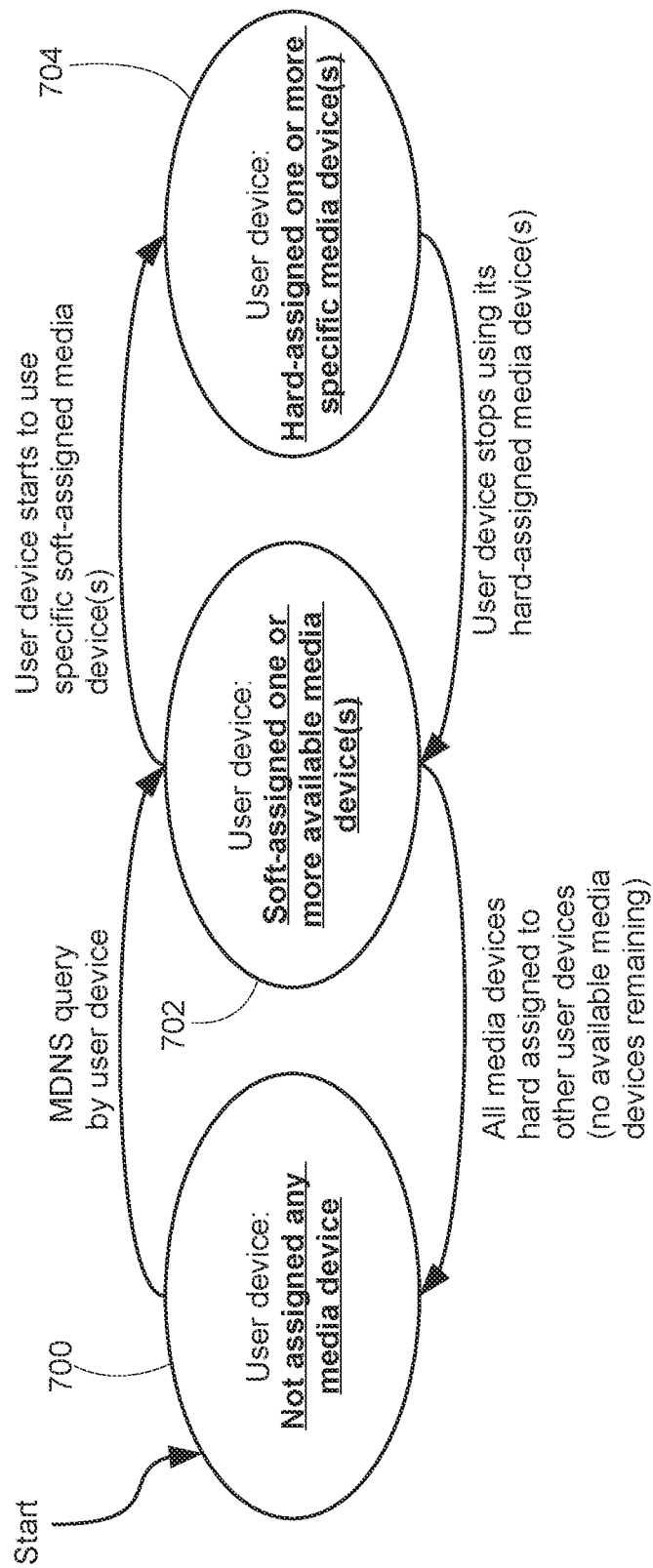
FIG. 7 illustrates a state transition diagram of media device assignments similar to FIG. 6 but from the point of view of a user device according to an exemplary embodiment.

FIG. 7 illustrates a state transition diagram of media device 104 assignments similar to FIG. 6 but from the point of view of a user device 116. As illustrated, each user device 116 in this embodiment can be in one of three states: not assigned any media device 700, soft-assigned one or more media device(s) 702, and hard-assigned one or more media device(s) 704. When not assigned any media devices 104 (state 700), the user device 116 is unable to communicate with any of the media devices 104. The gateway 112 (which may be integrated within the controller 106 or a separate device) by default prevents all multicast and unicast traffic from the user devices 116 passing from VLAN-guest 108 to VLAN-media 110. The user device 116 may or may not be aware of the existence of a media device 104 at this point. Regardless, if the user of the device 116 opens or otherwise utilizes an application on their device 116 that is capable of utilizing the network-based media sharing protocol (e.g., AirPlay®) supported by the MDNS proxy 114, the user device 116 will make an MDNS query for compatible devices 104. This query will be received by the controller 106 at step 308 and the controller 106 may soft assign one or more available media device(s) 104 to the user device 116 (state 702).

When soft-assigned one or more media devices 104 (state 702), the user device 116 can initiate direct unicast communications to said soft-assigned media devices 104 because the controller 106 has set up rules 210 allowing the gateway 112 (again, may be integrated within the controller 106 or a separate device) to pass such unicast traffic between VLAN-guest 108 and VLAN-media 110. At any time, the user device 116 may start communicating with a softly assigned media device 104 in order to begin utilizing a service such as AirPlay® streaming provided by the media device 104. The controller 106 will detect this session between the user device 116 and one of its softly assigned media devices 104 and then change the assignment to a hard assignment (state 704).

When hard-assigned one or more media devices (state 704), the user device 116 continues to be able to communicate with said one or more media devices 104 and the controller 106 ensures that no other unrelated user devices 116 are able to interfere with such communication. In this way, the user device 116 is freely able to utilize the services of its hard-assigned media device(s) 104. Hard assignment 704 basically means the user device 116 is able to communicate with the media device 104 and is actually making use of this communication ability. This state 704 continues in some embodiments until the user device 116 finishes using its hard-assigned media device(s) 104. At this point, the controller 106 switches the assignment back to a soft assignment 702 and allows other, unrelated user devices 116 to also be soft-assigned to the media device 104.

In the event that all media devices 104 are hard assigned to other user devices 116, there will be no remaining available media devices 104 left. In this event, the user device assignment state transitions from soft-assigned 702 back to the "not assigned any media device" state 700.

FIG. 3 is modified in some embodiments to gather and store the various details of the media devices 104 to avoid re-querying the selected media device 104 at steps 312, 314 each time an MDNS response is received at step 308. As mentioned, this particularly advantageous to support unicast responses at step 316 within a two second period of when the MDNS query is received at step 308. For some protocols that may change the data passed in the MDNS request and to support changing of the media devices 104 over time, in some embodiments, the queries at steps 312 and 314 are still performed and the responses stored. If step 316 can be performed utilizing the actual data received in response to step 314 within the required time duration (e.g., 2 seconds from the MDNS query at 308), the actual data received in response to step 314 is utilized. In other words, if the selected media device 104 replies at step 314 in time, the response from the selected media device 104 is utilized at step 316. Alternatively, if the response from the selected media device 104 is not received in time, at a predetermined time before the expiry of the time duration (such as at the 1.5 second mark), the controller 106 will simply generate and send the response at step 316 utilizing the stored data from a previous time that a response from the selected media device 104 was received at step 316. In this way, the system 100 can still provide unicast replies to the user device 116 at step 316 within a very short time duration such as two seconds and can over time take into account changes of the media devices 104 and/or special data that may be passed in the request received at step 308.

In some embodiments, step 408 of FIG. 4 is modified to only soft deassign unrelated user devices 116. In other words, it is not required at step 410 to always deassign all other user devices 116. As mentioned, it may be the case that a single family in a hotel room has multiple user devices 116. Each of these user devices 116 can stay soft-assigned (or become hard-assigned) to the selected media device 104 at step 410. In this way, they can compete with each other for usage of the selected media device 104 just like they would in a residential application.

FIG. 3 may also be modified to periodically announce an available media device 104 at step 306 such as one every five minute period for example.

Although the modified TTL values described above at steps 306, 316 and 424 have focused on modifying the TTL to be two second for the address records (and possibly other records besides the records that the desired service (e.g., "airplay") in their name, larger TTL values are also acceptable in other embodiments. The selection of TTL=2 is beneficial in some embodiments to reduce the chance that two unrelated user devices 116 will compete for control of a single media device 104. TTL of zero would mean the record is expired upon arrival—this value is likely an invalid TTL in the MDNS protocol and in any case would prevent the application on the user device 116 from actually obtaining the IP address of the media device 104. To deliberately expire a record such as in a goodbye message, the MDNS specification instructs responders to set TTL=1, which the receiving device 116 will then change to 0 and expire the record. TTL of two seconds is therefore the minimum value in some embodiments that includes a record value that can actually be utilized by an application running on the receiving user device 116. For a user device 116 that made an MDNS query received at step 308 because the user device 116 wants to start utilizing the service it is requesting, TTL=2 on the address record allows the application requesting the address on the user device 116 to receive the address and initiate communications. Likewise, for other user devices 116 that are not actually wanting to start utilizing the service and are instead just trying to find out if the service is available so they can put an icon on the user interface, TTL=2 on the address record is a very short period time to minimize chance a human user could actually click the newly appeared icon to cause the user device 116 to immediately initiate communications with the specified address.

That said, if desired a higher TTL could be used. For example, values between 2 seconds and 10 seconds would likely be suitable as well. However, the longer the value, the increased risk that two unrelated users could start streaming within the time period the address records stay valid. For instance, with a longer value such as 10 seconds, some situations could lead to one of multiple user devices 116 attempting to stream to receive an error message or to have their stream start and then stop once the other user device 116 started streaming. The result will depend on a race condition of which user device 116 the controller 106 recognizes first and which user device 116 the media device 104 recognizes first. If these two user devices 116 are different, one of the user devices 116 may start streaming and then fail. In many applications, this is not a big problem because the situation would likely be quickly remedied when the failing user device's 116 user re-clicks the icon to try again or the device automatically retries and by this time the other devices 116 are locked out, but failing after starting is a poor user experience. To help ensure that when streaming starts it will work properly, the TTL value on at least the MDNS address record should be set as short as possible while still allowing the application making the query on the user device 116 to actually receive the address of the media device 104.

Other modifications of the records may be performed at steps 306, 316 and 424 besides modifying the TTL values. In some embodiments, the controller 106 further changes the name of the media device 104 to be a common name for all media devices 104. In this way, the media devices 104 may have their own unique names but the user devices 116 will see a common name regardless of which media device 104 they are assigned (in both soft and hard assignment). Again taking the AirPlay® and AppleTV® example, each AppleTV® may have a unique name such as MediaDevice_1, MediaDevice_2, MediaDevice_3, etc. However, the controller 106 updates the name at steps 306, 316 and 424 to simply be "TV". In this way, the icons and other information displayed to the users on the UI of the user devices 116 will have a consistent name of "TV" regardless of which of the centrally located AppleTVs® 104 are actually assigned. Beneficially, if the soft assignment needs to change such as because of soft deassignment (see step 408) after a media device 104 is hard-assigned to another user device 116, the user will be completely unaware that their user device 116 has now been assigned a different AppleTV® 104 than was previously assigned.

Although the above system 100 has focused on a plurality of N sets of media devices 104 and encoders 118 located at a central location, in other embodiments, the media devices 104 may be distributed through the guest rooms 124 such that each guest room 124 has installed therein its own media device 104 (e.g., AppleTV®). No encoders 118 are needed in such an application, similar to as shown in other embodiments of the 733 patent—see FIG. 1 of the 733 patent showing in-room display devices 122 supporting the network-based media streaming protocol distributed through the hotel 101 and FIG. 3 of the 733 patent showing interactions of how user devices 116 are cleared through a gateway 112 for communication to a subset of the media devices 104. In yet other embodiments, the display devices 122 and the media devices 104 may be one and the same such as when an in-room TV 122 includes integrated AppleTV® and/or AirPlay® functionality. Again, having the controller 106 in some embodiments change the names of the media devices 104 at steps 306, 316 and 424 is beneficial to allow the media devices 104 to be distributed in the various guest rooms 124 but not bother the installers to worry about configuring unique names within the settings of each media device 104. Instead, the controller 106 can have the proper names specified for each media device 104 in the in-room display device table 214.

In the distributed embodiment where media devices 104 are located within the guest rooms 124, when an MDNS query is received at step 308, for example, the controller 106 determines the room 124 with which the user device 104 is associated and then changes the name of the selected media device 104 at step 316 to have a name that corresponds to the user's room 124 such as "TV—Room 101" (assuming the user is associated with room 101, for example). Especially if network switch port detection or other location detection is performed by the controller 106 to automatically determine with which room 124 each media device 104 is associated based on the received network traffic, the controller 106 can automatically assign names without any user interaction or updates of the in-room display device table 214 even if one of the media devices 104 is moved from a first room 124 to a second room 124 after the in-room display device table 214 is initially configured. For example, a media device 104 in a first guest room 124 may break and be replaced on the fly by hotel staff with a media device 104 taken from a vacant room. The controller 106 will detect the guest room 124 of the new media device 104 and assign it an appropriate name and the guest will see the correct name/room number on the icon of the media device 104 on the app running on their user device 116.

The above-described flowcharts illustrated in FIG. 3, FIG. 4 and FIG. 5 generally correspond to embodiments where the routing/gateway rules 210 allowing unicast traffic are added to the gateway 112 during soft assignment 602, 702. In other words, step 318 for adding the unicast rules is performed right during soft assignment 602, 702. Other embodiments are also possible. For instance, as illustrated in the flowcharts of FIG. 8, FIG. 9 and FIG. 10, rather than establishing the unicast routing rules when the soft assignment is performed (e.g., step 318), the unicast traffic rules are added to the gateway/firewall rules 210 after detecting a user device 116 is attempting to start utilizing the soft-assigned media device 104 (e.g., at step 440).

Figure 8:
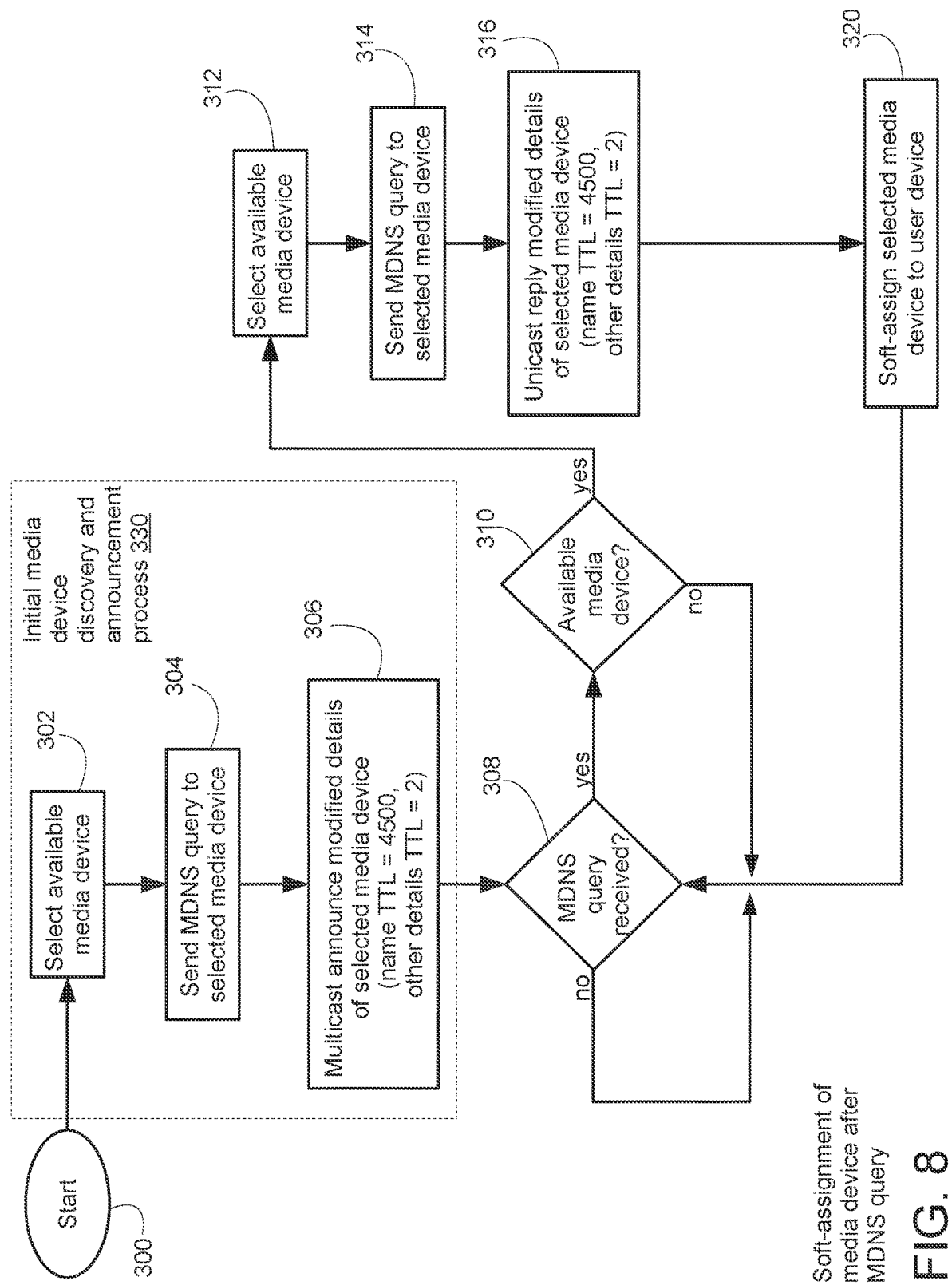
FIG. 8 illustrates a flowchart of operations performed by the controller in order to soft assign a media device to a user device without yet adding unicast rules enabling the two to communicate after receiving an MDNS query from the user device according to an exemplary embodiment.

FIG. 8 illustrates a flowchart of operations performed by the controller 106 in order to soft assign a media device 104 to a user device 116 without yet adding unicast rules enabling the two 104, 116 to communicate after receiving an MDNS query from the user device 116 according to an exemplary embodiment. The steps of FIG. 8 may be performed by processors 208 of the controller 106 executing instructions of the MDNS proxy module 114 and/or gateway module 112. The steps of the flowchart are not restricted to the exact order shown, and, in other configurations, shown steps may be omitted or other intermediate steps added.

Similar to FIG. 3, the process of FIG. 8 begins at step 300 and the various steps 300 to 316 illustrated in FIG. 8 are all very similar to as previously described for FIG. 3. Repeated description is omitted herein for brevity. However, a difference between FIG. 3 and FIG. 8 is that step 316 in FIG. 8 proceeds directly to step 320. In other words, the operation for adding unicast rules previously done at intermediate step 318 (shown only in FIG. 3) is omitted in FIG. 8. As a result, soft assignment in the embodiment of FIG. 8 involves associating the selected media device 104 with the user device 116 from which the MDNS query was received and does not actually involve enabling these two devices 104, 116 to communicate with each other.

Figure 9:
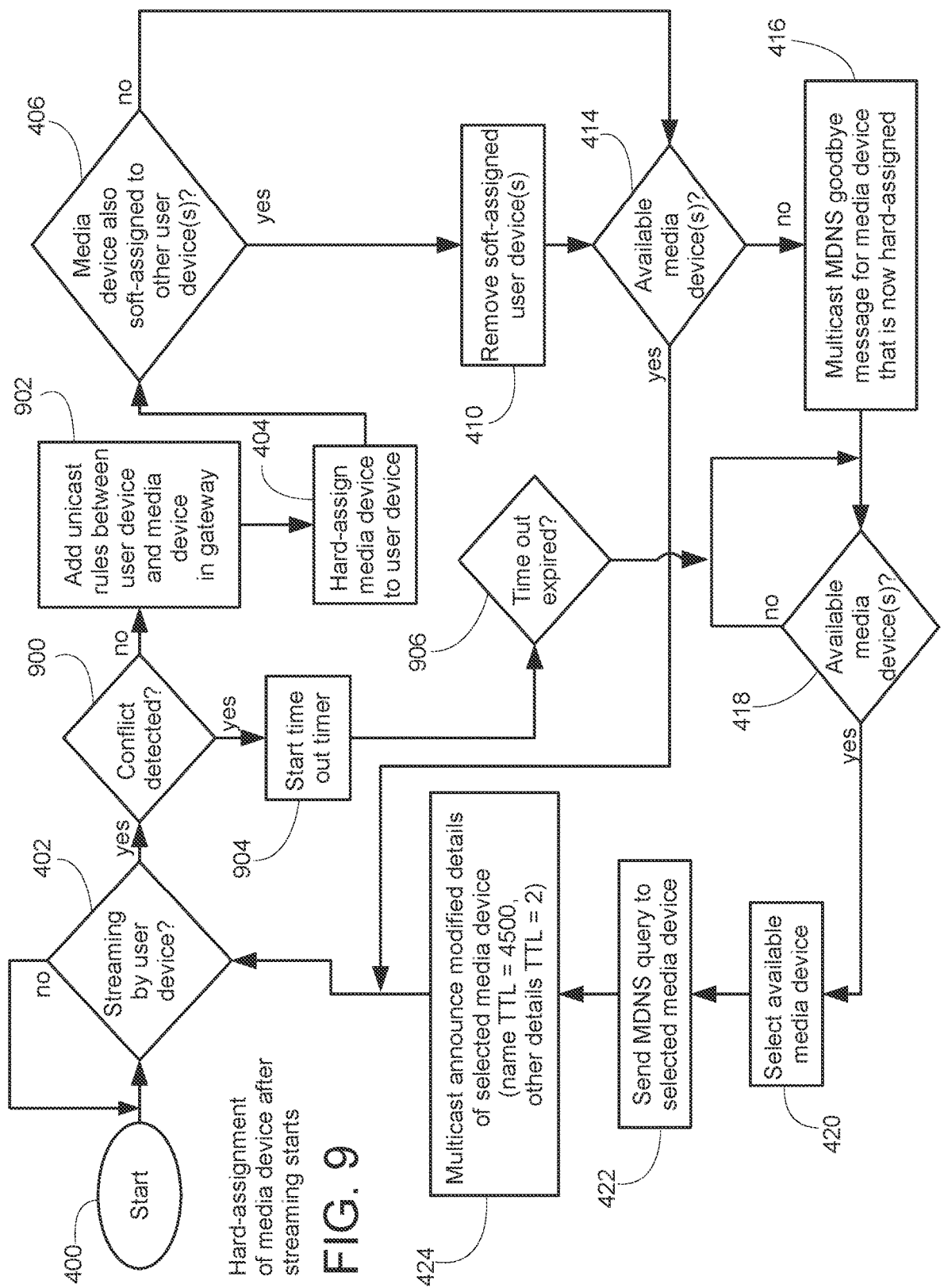
FIG. 9 illustrates a flowchart of operations performed by the controller in order to hard-assign a media device to a user device including adding the unicast rules allowing communication therebetween after detecting that the network-based media streaming protocol is actually being utilized between the two devices according to an exemplary embodiment.
Figure 10:
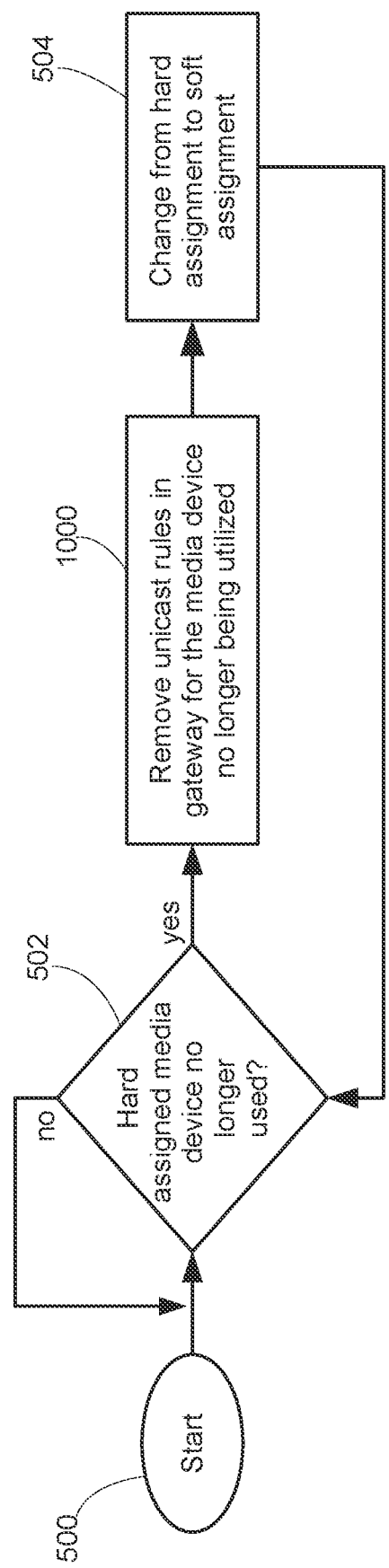
FIG. 10 illustrates a flowchart of operations performed by the controller in order to reset assignment from hard back to soft and to remove the unicast rules from the gateway when detecting that the network-based media streaming protocol is no longer being utilized between a user device and a hard-assigned media device according to an exemplary embodiment.

FIG. 9 illustrates a flowchart of operations performed by the controller 106 in order to hard-assign a media device 104 to a user device 116 including adding the unicast rules allowing communication therebetween after detecting that the network-based media streaming protocol is actually being utilized between the two devices 104, 116 according to an exemplary embodiment. The steps of FIG. 9 may be performed by processors 208 of the controller 106 by executing instructions of the MDNS proxy module 114 and/or gateway module 112. In some embodiments, the process of FIG. 9 is performed by the controller 106 in parallel with the process of FIG. 8, for example performed at the same time on different cores or by multitasking operations of a single core. The steps of the flowchart are not restricted to the exact order shown, and, in other configurations, shown steps may be omitted or other intermediate steps added.

There are many similarities between the individual steps of FIG. 9 and those illustrated in FIG. 4. Repeated descriptions of steps having the same name and functionality are omitted for brevity. However, it is helpful to describe a few differences.

New steps 900-906 are added in FIG. 9 generally between steps 402 and 404. Step 900 involves checking whether the user device 116 detected to be attempting to start streaming at step 402 is targeting a media device 104 that is already hard assigned to another user device 116. In this case, there is a conflict because in this embodiment, only one user device 116 can be streaming to a media device 104 at a time. When there is no conflict and the target media device 104 is not already hard assigned, control proceeds to step 902; otherwise, when a conflict is detected, control proceeds to step 904.

At step 902, the controller 106 adds the unicast rules 210 allowing the user device 116 and the media device 104 to communicate with each other. In many ways it is similar to the previously described step 318. In FIG. 9, step 402 involves the controller 106 determining whether a user device 116 is attempting to start streaming with an available media device 104. When this media device 104 is still available when the streaming attempt starts (i.e., no conflict at step 900), the controller 106 will add unicast rules 210 between the user device 116 and its now hard assigned media device 104 (at step 902) and update its media device assignment records 212 to hard assign that specific media device 104 to the user device 116 (at step 404). From this point on, the user device 116 and its hard assigned media device 104 are in network communication with each other via the gateway 112. Media streaming functions can be initiated on the user device 116 for display on the media device 104. For instance, a user may initiate playing a YouTube® movie and the appropriate AirPlay® messages are sent from the user device 116 to the media device 104 to cause the media device 104 to stream and play the selected YouTube® movie. The output of the media device 104 is then sent to an appropriate in-room TV or other display device 122 for playback.

In some embodiments, in the event that a conflict is detected at step 900, at step 904 the controller 106 starts a time out timer. Step 904 may be reached in the event of a race condition between two user devices 116 attempting to start streaming to a same available media device 104 at the same time. The first one (the race winner) will proceed to step 902 and gain hard assignment at step 404. The second one (the race loser) will proceed to step 904. Some protocols such as AirPlay® will ignore all multicast announcements for a media device 104 that advertises its availability but then is unreachable over the network. The user device 116 may ignore such announcements for about two minutes. In some embodiments, the time out timer started at step 904 is for a greater time period such as three minutes. In this way, upon time out expiry at step 906, the controller 106 will proceed to step 418 to check whether there is now an available media device 104 and then multicast an announcement. In this way, in the event the user device 116 that lost the race removes its AirPlay® streaming icon on its user interface, as soon as the time out period expires, the icon will return.

Another difference between FIG. 9 and FIG. 4 is that the removal of soft-assignments at step 410 is simplified in FIG. 9. In this embodiment, the unicast rules 210 are not added during soft-assignment and therefore do not need to be removed for all other user device(s) 116 for which the no-longer-available media device 104 was previously soft-assigned. Step 410 in FIG. 9 involves the processor 208 updating the media device assignment records 212 in memory 202, but there is no longer any need to remove unicast rules 210 for these soft assignments.

Although not illustrated in FIG. 9, in some embodiments another difference is the "yes" branch of step 414 may instead proceed to step 420. In some embodiments, once a media device 104 is hard assigned to a user device 116 and the unicast rules 210 are added at steps 404 and 900, the controller 106 checks whether there is any other available media device(s) 104 in the system 100. Again, the available media device(s) 104 are those media device(s) 104 that are not currently hard assigned to a user device 116. Assuming there is at least one available, step 414 proceeds to step 420 to select one and then to gather the current MDNS information (step 422) in order to announce a modified version of said details out to the user device 116 (step 424). The purpose of the adjustment from step 414 to proceed to step 420 is to ensure that the remaining user devices 116 are now given the IP address of an actually available media device 104. In this way, when they attempt to start utilizing the streaming protocol by sending packets to that IP address, this activity will be detected at step 402 and trigger the hard-assignment process to start as illustrated in FIG. 9 for the new user device 116.

FIG. 10 illustrates a flowchart of operations performed by the controller 106 in order to reset assignment from hard back to soft and to remove the unicast rules 210 from the gateway 112 when detecting that the network-based media streaming protocol is no longer being utilized between a user device 116 and a hard-assigned media device 104 according to an exemplary embodiment. The steps of FIG. 10 may be performed by processors 208 of the controller 106 by executing instructions of the MDNS proxy module 114 and/or gateway module 112. In some embodiments, the process of FIG. 10 is performed by the controller 106 in parallel with the processes of FIGS. 8 and 9, for example performed at the same time on different cores or by multitasking operations of a single core. The steps of the flowchart are not restricted to the exact order shown, and, in other configurations, shown steps may be omitted or other intermediate steps added.

Again, steps 500, 502, and 504 of FIG. 10 are very similar to those same steps in FIG. 5 so a repeated description is omitted. As illustrated in FIG. 10, a new step 1000 is added between steps 502 and 504. Step 1000 involves the controller 106 removing the unicast rules 210 in the gateway 112 for the media device 104 that is being changed from hard to soft assignment. In this way, user devices 116 and media devices 104 are unable to communicate with each other unless the media device 104 has actually been hard assigned to the user device 116.

The embodiment illustrated in FIGS. 8-9 involves adding unicast rules 210 during hard assignment 604, 704. Soft assignment 602, 702 is utilized primarily to attempt to ensure that user devices 116 are consistently provided the information of a same AppleTV, i.e., the information of the same one or more AppleTVs (or other media devices 104) that are soft assigned to the user device 116. In this way, each time the user device 116 makes an MDNS query, as long as the soft assigned media device 104 is still available at step 312, the user device 116 will again receive an MDNS response providing the IP address of that same media device 104 at step 316.

In some embodiments, the soft assignment state 602, 702 is so that the response back to the iOS TV remains the same through future requests when Airplay has not started. In this way, during device discovery and soft assignment illustrated in FIG. 8, sending the modified details at step 316 is associated with the soft assignment at step 320 so that the controller can provide the same Apple TV information each time these steps are run. In particular, step 312 of selecting the available media device 104 gives preference to selecting the same media device 104 that is currently soft assigned to the user device 116. Furthermore, if all Apple TVs (or other media device 104) are in use and hard assigned to other user devices 116 but then one becomes available a response can be sent back to the iOS devices 116 for which that AppleTV 104 is soft assigned.

Another advantage of the soft assignment records stored in the storage device 202 pertains to how streaming can be detected at step 402 of FIG. 9, for example. In some embodiments, streaming is detected at step 402 by utilizing an MDNS announcement method. It has been observed that whenever AirPlay® begins to actually be utilized, both the AppleTV® 104 and the iPhone 116 will transmit a multicast announcement of their ability to perform "itunes control". These announcements come before the streaming starts and provide a port of the device for performing "itunes control" but do not specify the target device with which streaming has been started. In some embodiments, the controller 106 monitors the user devices 116 at step 402 to detect when the user device 116 transmits such an announcement. In response to receiving such a message, the controller 106 checks the media device assignments 212 in the data storage device 202 to determine which media device 104 is currently soft assigned to the user device 116 that sent the announcement. (The source address of the user device 116 that sent the announcement is included in the announcement.) The controller 106 then proceeds to check for conflicts with the soft assigned media device 104 at step 900 and the rest of the flowchart proceeds as follows. In this way, the soft assignment records 212 allow the controller 106 to deduce the target media device 104 according to transmissions from the user device 116 without an identification of said media device 104 being included in the transmissions.

In other embodiments, packet sniffing techniques may be utilized instead where the usage at step 402 is determined by monitoring for actual TCP connection requests transmitted from the user device 116 to a particular AppleTV® 104, for example.

Figure 11:
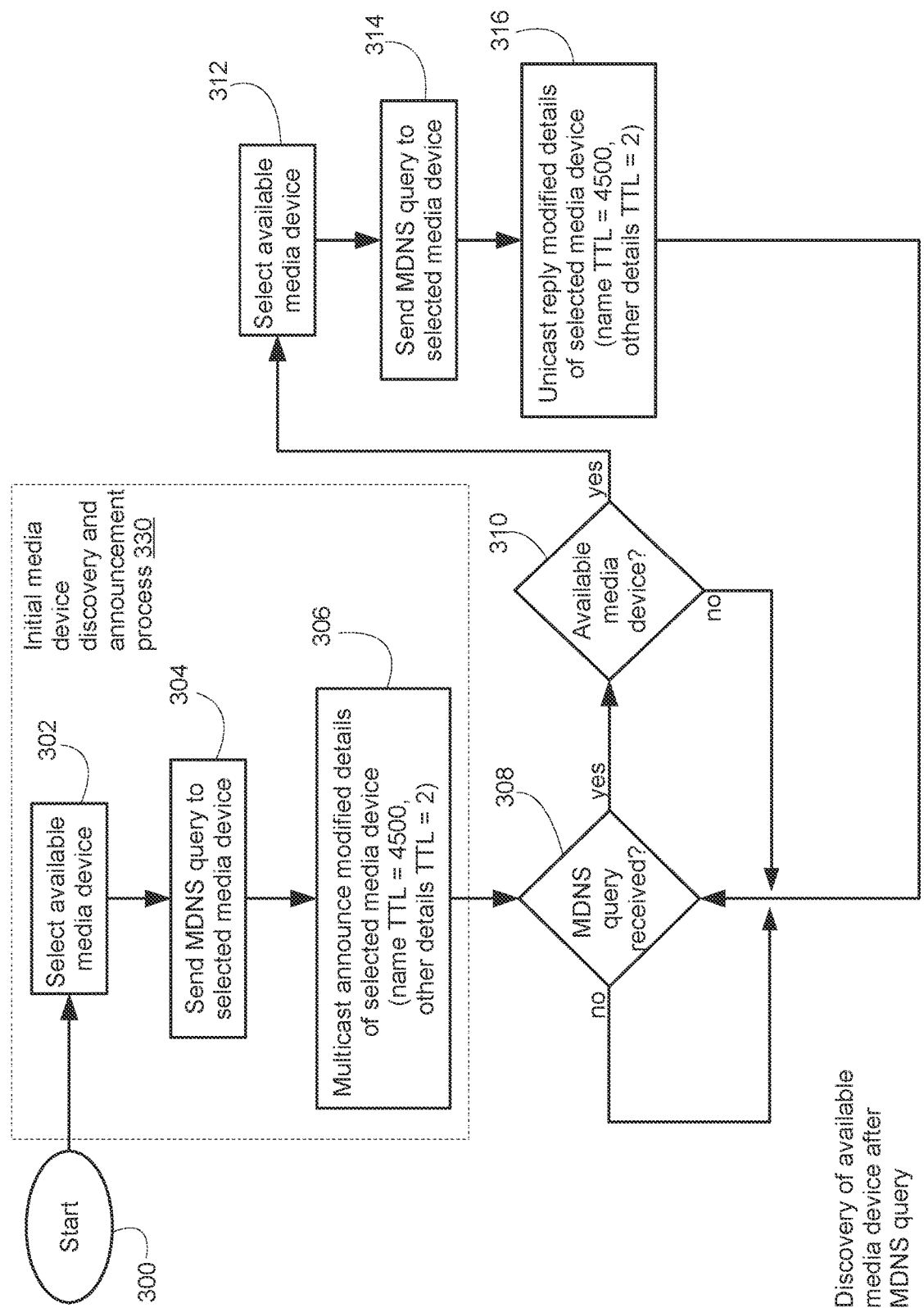
FIG. 11 illustrates a flowchart of operations performed by the controller in order to allow user devices to discover one or more available media devices after receiving an MDNS query from the user device according to an exemplary embodiment.
Figure 12:
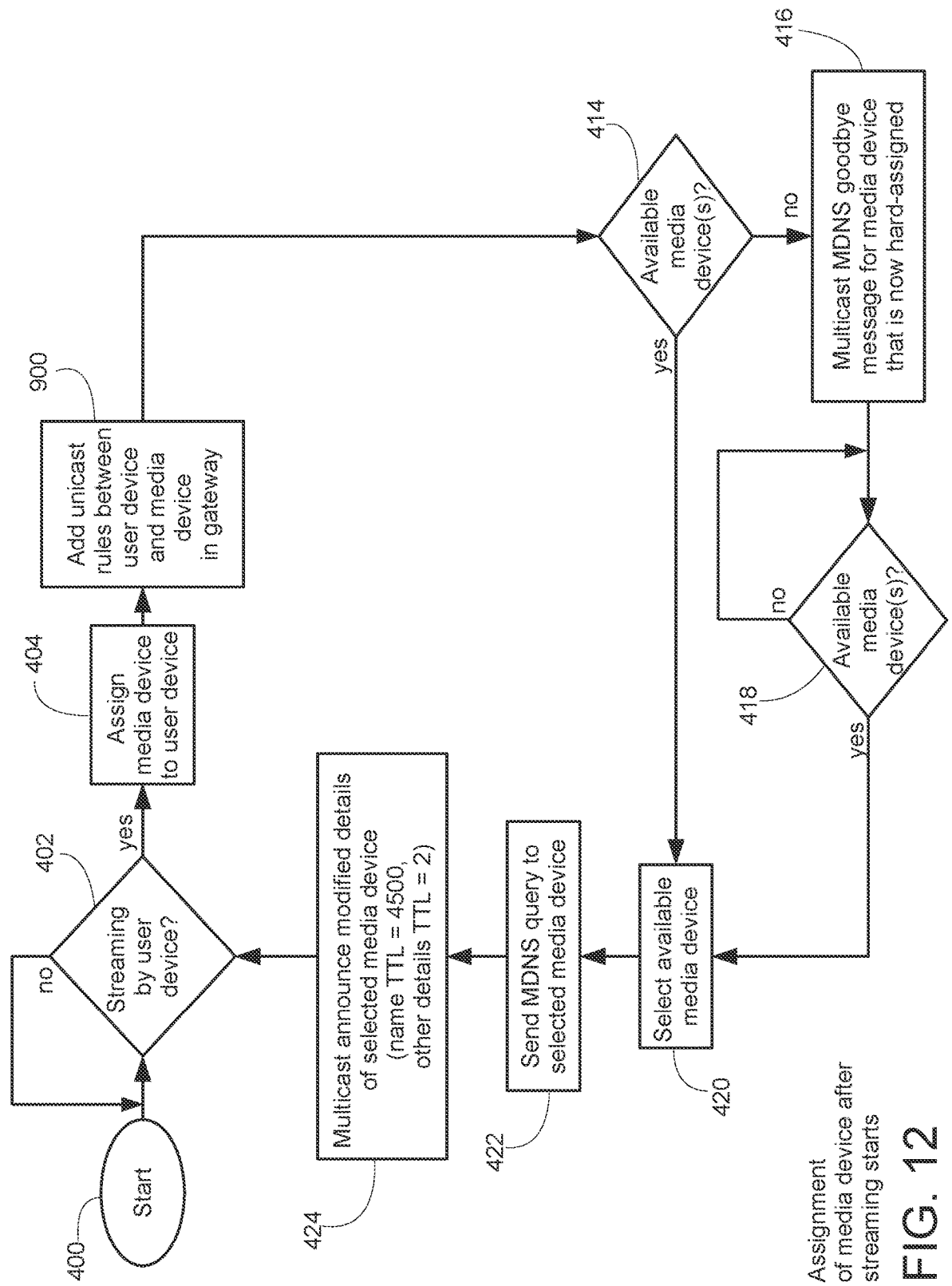
FIG. 12 illustrates a flowchart of operations performed by the controller in order to assign a media device to a user device including adding unicast rules allowing communication therebetween after detecting that the network-based media streaming protocol is actually being utilized between the two devices according to an exemplary embodiment.
Figure 13:
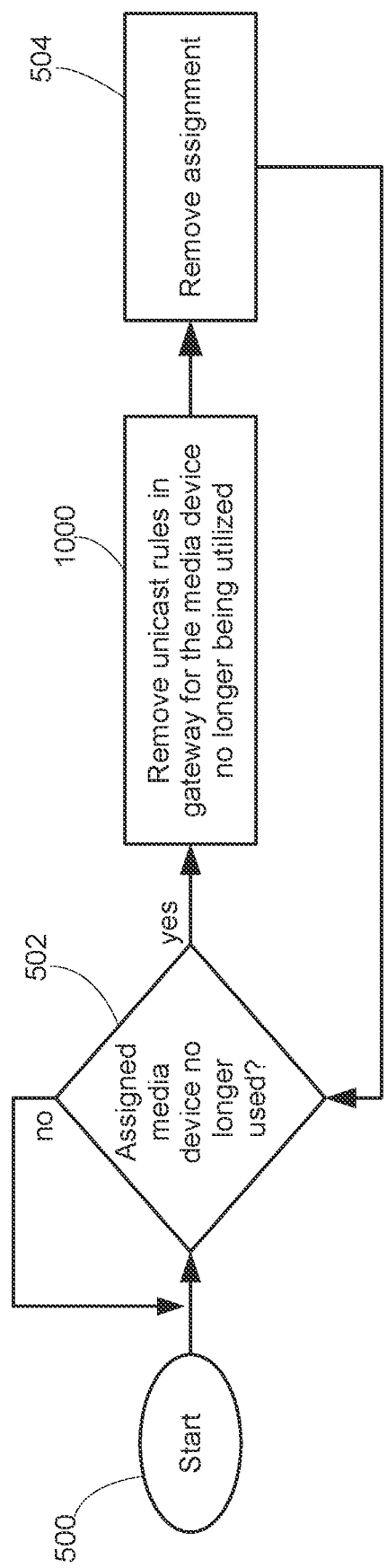
FIG. 13 illustrates a flowchart of operations performed by the controller in order to remove the assignment and unicast rules from the gateway when detecting that the network-based media streaming protocol is no longer being utilized between a user device and its assigned media device according to an exemplary embodiment.

In cases where it is unnecessary for the same AppleTV (or other media device 104) to be provided each time at step 316, the soft assignment state 602, 702 can be omitted. FIGS. 11-13 illustrate an embodiment of such a process where soft assignment is omitted. In the embodiment of FIGS. 11-13, only hard assignment is utilized and is therefore simply referred to as "assignment" without needing to differentiate between hard and soft assignments.

FIG. 11 illustrates a flowchart of operations performed by the controller 106 in order to allow user devices 116 to discover one or more available media devices 104 after receiving an MDNS query from the user device 116 according to an exemplary embodiment. The steps of FIG. 11 may be performed by processors 208 of the controller 106 executing instructions of the MDNS proxy module 114 and/or gateway module 112. The steps of the flowchart are not restricted to the exact order shown, and, in other configurations, shown steps may be omitted or other intermediate steps added.

As illustrated, the steps of FIG. 11 are very similar to those of FIG. 8; however, in FIG. 11 the soft assignment step 320 is omitted. Step 312 can also be modified to simply look for an available media device 104, i.e., a media device 104 that is not currently assigned to any specific user device 116 and is therefore available for assignment.

FIG. 12 illustrates a flowchart of operations performed by the controller 106 in order to assign a media device 104 to a user device 116 including adding unicast rules 210 allowing communication therebetween after detecting that the network-based media streaming protocol is actually being utilized between the two devices 104, 116 according to an exemplary embodiment. The steps of FIG. 12 may be performed by processors 208 of the controller 106 by executing instructions of the MDNS proxy module 114 and/or gateway module 112. In some embodiments, the process of FIG. 12 is performed by the controller 106 in parallel with the process of FIG. 11, for example performed at the same time on different cores or by multitasking operations of a single core. The steps of the flowchart are not restricted to the exact order shown, and, in other configurations, shown steps may be omitted or other intermediate steps added.

As illustrated, the steps of FIG. 12 are very similar to those of FIG. 9; however, in FIG. 12, step 404 is modified to simply be an "assignment" without needing to designate that it is a hard assignment as was done in FIG. 9. Furthermore, because there is no concept of "soft" assignment in the embodiment of FIGS. 11-13, the steps 406 and 410 related to removing soft-assignments in FIG. 9 are omitted from FIG. 12.

FIG. 13 illustrates a flowchart of operations performed by the controller 106 in order to remove the assignment and unicast rules 210 from the gateway 112 when detecting that the network-based media streaming protocol is no longer being utilized between a user device 116 and its assigned media device 104 according to an exemplary embodiment. The steps of FIG. 13 may be performed by processors 208 of the controller 106 by executing instructions of the MDNS proxy module 114 and/or gateway module 112. In some embodiments, the process of FIG. 13 is performed by the controller 106 in parallel with the processes of FIGS. 11 and 12, for example performed at the same time on different cores or by multitasking operations of a single core. The steps of the flowchart are not restricted to the exact order shown, and, in other configurations, shown steps may be omitted or other intermediate steps added.

As illustrated, the steps of FIG. 13 are very similar to those of FIG. 10; however, in FIG. 13, step 502 is modified to check whether any assigned media device 104 is no longer being utilized without needing to designate "hard" assigned. Likewise, the assignment at step 504 is removed again without needing to designate it's the "hard" assignment that is removed.

As illustrated above, there are at least three variations of embodiments including:

1. Unicast Rules added during "Soft" assignment for each user device 116, then removed for all except active user device 116 actually using media device during "Hard" assignment In this embodiment, unicast rules 210 added for a querying user device 116 during soft assignment 602, 702; hard assignment removes them for everyone except the user device 116 that is actually now using the AppleTV (or other media device 104). Adding the unicast rules 210 during soft assignment 602, 702 may be beneficial to support any type of protocol without the controller 106 necessarily needing to understand or otherwise be compatible with the protocol. To avoid conflicts between unrelated user devices 116, the controller 106 allows everyone during soft assignment to communicate but then detects when usage occurs in order to remove the unicast rules 210 for other user devices 116 upon detecting usage by a first user device 116. For example, the proxy 114/controller 106 may watch for packets being sent between iOS device 116 and AppleTV 104 (e.g., packet amounts, frequency, etc.). Upon a threshold amount of activity between them, the proxy 114/controller 106 designated the hard assignment and removes the unicast rules 210 for other, unrelated iOS devices 116. The removal could happen a bit later as well and there may be no super rush for the controller 106/proxy 114 to get the unicast rules 210 in place upon the very first packet of usage between a user device 116 and its soft assigned media device 104. A downside is perhaps a race condition between two iOS devices 116 that happen to go at same time, but such a race condition would likely work out naturally where one would win and the other would get reassigned by the controller 106/proxy 114 to a new media device 104 where it would immediately work as well.

2. "Soft" assignment details recorded by controller so that consistent media device 104 information is provided; unicast rules 210 allowing communication added during "hard" assignment 604, 704 when user device 116 actually starts to use a soft assigned media device 104

In this embodiment, soft assignment 602, 702 is used so that controller 106/proxy 114 can keep track of and do consistent replies for each user device 116 to try to ensure they generally are getting the same AppleTV's information (or other media device's 104 information) each time. Unicast rules 210 are added to the gateway 112 during hard assignment 604, 704 when one of the user devices 116 actually starts to use its soft-assigned AppleTV 104.

3. Only one type of assignment utilized, unicast rules 210 allowing communication added during assignment when user device 116 actually starts to use an assigned media device In this embodiment, the previously-described "soft" assignment state is omitted so a user device 116 may get different AppleTVs 104 each time the user device 116 makes an MDNS query, but for some protocols this doesn't matter. The controller 106/proxy 114 modifying the MDNS response to have TTL=2 for address information of the media device 104 ensures that the user devices 116 need to re-query and get new information each time they might actually need the service. In response to each query, the user device 116 gets back the info of an available AppleTV (or other media device 104) in the system 100. When a user device 116 actually starts to stream to the available AppleTV 104, then unicast rules 210 are added and assignment in place. Other user devices 116 will get the info a new available AppleTV 104 upon next query.

Although the above description has focused on user devices 116 such as iOS devices, media devices 104 such as AppleTVs®, and network-based media sharing protocols such as AirPlay®, other types of resource-seeking devices 130, resource-providing devices 102, protocols other than network-based media sharing can be utilized in a similar manner. In general, the above teachings can be utilized in a system 100 to have a controller 106 assign any resource-providing devices 104 to specific resource-seeking devices 130 while preventing other resource-seeking devices 130 from interrupting or gaining access to non-allowed resource-providing devices 102. Beneficially, by significant reduction of TTL values on specific records passed by MDNS combined with isolating resource-providing devices 104 from the resource-seeking devices 130, a controller 106 can assign and deassign any combination of resource-seeking and resource-providing devices 130, 102 to one another and maintain isolation of non-assigned devices 130, 102.

In an advantageous embodiment, an apparatus 106 for helping with multicast domain name service (MDNS) discovery includes one or more processors 208 configured to receive a first MDNS query from the resource-seeking device 130, receive a first MDNS response from the resource-providing device 102, and generate a second MDNS response according to the first MDNS response. The second MDNS response is generated at least by including a resource record from the first MDNS response and setting a time-to-live (TTL) value of the resource record in the second MDNS response to be lower than an original TTL value as specified for the resource record in the first MDNS response. The second MDNS response is sent to the resource-seeking device 130 in response to the first MDNS query. A hospitality establishment 101 may thereby soft assign a media device 104 to a user device 116 while retaining the ability to change the media device 104 assigned to the user device 116.

In some embodiments, the controller 106 will pass multicast announcements from VLAN-guest 108 to VLAN-media 110 but will only pass select multicast announcements from VLAN-media 110 back to VLAN-guest 108. For instance, certain service announcements are passed by the controller 106 from VLAN-media 110 back to VLAN-guest 108 may be modified with longer TTL values as described above. In some embodiments, other announcements from the AppleTVs® 104 are blocked by the controller 106. Optionally, in other embodiments, other types of messages such as "itunes control" messages may also be passed from VLAN-media 110 back to VLAN-guest 108.

Although the invention has been described in connection with preferred embodiments, it should be understood that various modifications, additions and alterations may be made to the invention by one skilled in the art without departing from the spirit and scope of the invention. For example, although the above-description has focused on a hotel for illustration purposes, the present invention is equally applicable to any hospitality related location or service including but not limited to hotels, motels, resorts, hospitals, apartment/townhouse complexes, restaurants, retirement centers, cruise ships, busses, airlines, airports, shopping centers, passenger trains, libraries, coffee shops, hotspots, etc. Additionally, in addition to the above described hospitality examples, the invention is applicable outside the hospitality industry such as when a home or corporate user desires to assign and control the ability of user devices 116 to utilize media devices 104 discovered utilizing the MDNS or similar protocols.

Although the various flowcharts are described as being loops performed in parallel, in some embodiments, these flowcharts represent threads that are spawned off. For instance, whenever a hard assignment is performed by the controller 106 at step 404, the controller 106 may then spawn off a thread comprising the functions of FIG. 10 in order to monitor and detect when the user device 116 stops utilizing the streaming.

The modules 112, 114 may be implemented by software executed by one or more processors 208 operating pursuant to instructions stored on a tangible computer-readable medium such as a storage device 200 to perform the above-described functions of any or all aspects of the controller 106. Examples of the tangible computer-readable medium include optical media (e.g., CD-ROM, DVD discs), magnetic media (e.g., hard drives, diskettes), and other electronically readable media such as flash storage devices and memory devices (e.g., RAM, ROM). The computer-readable medium may be local to the computer executing the instructions, or may be remote to this computer such as when coupled to the computer via a computer network such as the Internet 128. The processors 208 may be included in a general-purpose or specific-purpose computer that becomes the controller 106 or any of the above-described modules 112, 114 as a result of executing the instructions.

In other embodiments, rather than being software modules executed by one or more processors, the modules 112, 114 may be implemented as hardware modules configured to perform the above-described functions. Examples of hardware modules include combinations of logic gates, integrated circuits, field programmable gate arrays, and application specific integrated circuits, and other analog and digital circuit designs.

Each of the illustrated flowcharts and described steps may be omitted or interconnected in different ways such as to be performed in different orders in other embodiments. For example, in some embodiments, step 416 in FIG. 4 to transmit the goodbye message may be omitted. In some embodiments, step 414 is also omitted and step 412 always proceeds back to step 402 without checking for any remaining available media devices 104. Similarly, step 416 in FIG. 9 and FIG. 12 may also be omitted and/or amended in a similar manner. In yet another example, the conflict check at step 900 and time-out timer start and expiry checks at steps 904 and 906 are omitted.

Functions of single modules may be separated into multiple units, or the functions of multiple modules may be combined into a single unit. For example, although the Internet gateway 126 is shown as a separate computer server from the controller 106 in FIG. 1, in some embodiments, these two gateways 112, 126 may be combined in a single computer server. In other words, the controller 106 uses the Internet gateway 126 (or any other router/gateway on the network) to handle the routing. As long as the network is set up properly, the default gateway (in this case the Internet gateway 126) could be the device that does the routing between VLAN-guest 108 and VLAN-media 110 given that it has some means of receiving the information to act on the change of forwarding and routing rules on demand. The gateway 112 shown in the controller 106 of FIG. 1 does not need to reside on the same physical box or even logical server as the controller 106. It could be somewhere else on the network with an agent that receives commands from the controller 106 to enact firewall/routing rule 210 changes when assigning/de-assigning media devices 104 to/from user devices 116.

In other embodiments, there are two gateways 112, 126. A default gateway which is high speed Internet access (HSIA) for a guest device 116 on the hotel LAN 108 to access the Internet 128. Then there is the gateway 112 to the media devices 104 which in this case is within the controller 106. A routing rule is added to an HSIA control server to state that any traffic going to the media network 110 should be routed to the controller gateway 112 for media devices 104. The controller 106 for the media devices 104 then creates the firewall rules 210 to allow the traffic to pass.

In FIG. 2, the two network interfaces 204, 206 are actually the same network interface in other embodiments. When a single network interface is utilized, the interfaces and/or processors 208 are configured to understand the two different VLAN IDs: one for VLAN-media 110 and one for VLAN-guest 108.

Unless otherwise specified, features described may be implemented in hardware or software according to different design requirements. In addition to a dedicated physical computing device, the word "server" may also mean a service daemon on a single computer, virtual computer, or shared physical computer or computers, for example. All combinations and permutations of the above described features and embodiments may be utilized in conjunction with the invention.

What is claimed is:

1. An apparatus for helping with multicast domain name service (MDNS) discovery between resourcing-seeking and resource-providing devices on different computer networks, the apparatus comprising:
   one or more network interfaces connectable to a first network and a second network;
   one or more storage devices storing a plurality of software instructions; and
   one or more processors coupled to the one or more network interfaces and the one or more storage devices;
   wherein, by the one or more processors executing the software instructions loaded from the one or more storage devices, the one or more processors are configured to:
      receive an incoming MDNS query from a resource-seeking device via the first network;
      select an available resource-providing device from a plurality of resource-providing devices on the second network;
      send an outgoing MDNS query to the available resource-providing device via the second network;
      receive an original MDNS response from the available resource-providing device via the second network;
      modify one or more resource records of the incoming MDNS response to form a modified MDNS response, the modified MDNS response at least including a resource record from the original MDNS response but having a time-to-live (TTL) value of the resource record in the modified MDNS response modified to be a lower value than an original time-to-live (TTL) value as specified for the resource record in the original MDNS response from the available media device; and
      send the modified MDNS response to the resource-seeking device via the first network.

2. The apparatus of claim 1, wherein the one or more processors are further configured to generate the outgoing MDNS query having at least some information as included in the incoming MDNS query from the resource-seeking device.

3. The apparatus of claim 1, wherein the one or more processors are further configured to generate the outgoing MDNS query according to the incoming MDNS query at least by changing a unicast-response bit (QU bit) from multicast in the incoming MDNS query to unicast in the outgoing MDNS query.

4. The apparatus of claim 1, wherein the one or more processors are further configured to send the outgoing MDNS query to the available resource-providing device as a unicast query directly to an IP address of the available media device on the second network.

5. The apparatus of claim 1, wherein the one or more processors are further configured to send the outgoing MDNS query to the available resource-providing device as either a multicast query or a unicast query according to whether the incoming MDNS query from the resource-seeking device was sent as a multicast or a unicast query.

6. The apparatus of claim 1, wherein the one or more processors are further configured to send the modified MDNS response to the resource-seeking device as a unicast reply in response to the incoming MDNS query from the resource-seeking device.

7. The apparatus of claim 1, wherein the one or more processors are further configured to:
   in advance of receiving the incoming MDNS query, send the outgoing MDNS query to the available resource-providing device via the second network and store in the one or more storage devices a plurality of service record details of the available media device as specified in the original MDNS response; and
   modify the one or more resource records of the incoming MDNS response to form the modified MDNS response according to the service record details stored in the one or more storage records.

8. The apparatus of claim 1, wherein the one or more processors are further configured to send the modified MDNS response to the resource-seeking device via the first network within two seconds of receiving the incoming MDNS query from the resource-seeking device.

9. The apparatus of claim 1, wherein the one or more processors are further configured to either:
   a) send the outgoing MDNS query to the available resource-providing device in response to receiving the incoming MDNS query from the resource-seeking device; or
   b) utilize a previous MDNS query sent to the available resource-providing device as the outgoing MDNS query;

according to information included in the incoming MDNS query.

10. The apparatus of claim 1, wherein the one or more processors are further configured to form the modified MDNS response having a time-to-live (TTL) of all service records of the original MDNS response changed to be two seconds except for one or more service records of the original MDNS response that include a predetermined service name, wherein the one or more service records of the original MDNS response that include the predetermined service name are left in the modified MDNS response at their original time-to-live (TTL) values as sent by the available resource-providing device.

11. The apparatus of claim 10, wherein the predetermined service name is "airplay".

12. The apparatus of claim 1, wherein:
each of the plurality of resource-providing devices has a unique name; and
the one or more processors are further configured to form the modified MDNS response further by changing a name of the available media device to be a common name regardless of which of the plurality of media devices is selected as the available media device.

13. The apparatus of claim 1, wherein the first network is a first virtual local area network (VLAN) and the second network is a second virtual local area network (VLAN).

14. A method of helping with multicast domain name service (MDNS) discovery between resourcing-seeking and resource-providing devices on different computer networks, the method comprising:
receiving an incoming MDNS query from a resource-seeking device via a first network;
selecting an available resource-providing device from a plurality of resource-providing devices on a second network;
sending an outgoing MDNS query to the available resource-providing device via the second network;
receiving an original MDNS response from the available resource-providing device via the second network;
modifying one or more resource records of the incoming MDNS response to form a modified MDNS response, the modified MDNS response at least including a resource record from the original MDNS response but having a time-to-live (TTL) value of the resource record in the modified MDNS response modified to be a lower value than an original time-to-live (TTL) value as specified for the resource record in the original MDNS response from the available media device; and
sending the modified MDNS response to the resource-seeking device via the first network.

15. The method of claim 14, further comprising generating the outgoing MDNS query having at least some information as included in the incoming MDNS query from the resource-seeking device.

16. The method of claim 14, further comprising generating the outgoing MDNS query according to the incoming MDNS query at least by changing a unicast-response bit (QU bit) from multicast in the incoming MDNS query to unicast in the outgoing MDNS query.

17. The method of claim 14, further comprising sending the outgoing MDNS query to the available resource-providing device as a unicast query directly to an IP address of the available media device on the second network.

18. The method of claim 14, further comprising sending the outgoing MDNS query to the available resource-providing device as either a multicast query or a unicast query according to whether the incoming MDNS query from the resource-seeking device was sent as a multicast or a unicast query.

19. The method of claim 14, further comprising forming the modified MDNS response having a time-to-live (TTL) of all service records of the original MDNS response changed to be two seconds except for one or more service records of the original MDNS response that include a predetermined service name, wherein the one or more service records of the original MDNS response that include the predetermined service name are left in the modified MDNS response at their original time-to-live (TTL) values as sent by the available resource-providing device.

20. A non-transitory processor-readable medium comprising a plurality of processor-executable instructions that when executed by one or more processors cause the one or more processors to perform steps of:
receiving an incoming MDNS query from a resource-seeking device via a first network;
selecting an available resource-providing device from a plurality of resource-providing devices on a second network;
sending an outgoing MDNS query to the available resource-providing device via the second network;
receiving an original MDNS response from the available resource-providing device via the second network;
modifying one or more resource records of the incoming MDNS response to form a modified MDNS response, the modified MDNS response at least including a resource record from the original MDNS response but having a time-to-live (TTL) value of the resource record in the modified MDNS response modified to be a lower value than an original time-to-live (TTL) value as specified for the resource record in the original MDNS response from the available media device; and
sending the modified MDNS response to the resource-seeking device via the first network.

\* \* \* \* \*